US008111893B2

(12) United States Patent
Chen et al.

(10) Patent No.: US 8,111,893 B2
(45) Date of Patent: Feb. 7, 2012

(54) METHOD FOR DYNAMIC PRIOR IMAGE CONSTRAINED IMAGE RECONSTRUCTION

(75) Inventors: Guang-Hong Chen, Madison, WI (US); Jie Tang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 428 days.

(21) Appl. No.: 12/481,271

(22) Filed: Jun. 9, 2009

(65) Prior Publication Data

US 2010/0310144 A1    Dec. 9, 2010

(51) Int. Cl.
*G06K 9/00* (2006.01)
(52) U.S. Cl. ........ 382/131; 382/132; 382/130; 382/128; 600/410; 324/307; 324/309
(58) Field of Classification Search ................ 382/128, 382/129, 130, 131, 132; 600/410; 324/309, 324/307
See application file for complete search history.

(56) References Cited

U.S. PATENT DOCUMENTS

| | | | |
|---|---|---|---|
| 5,053,958 A * | 10/1991 | Tam ................................. | 378/4 |
| 6,841,998 B1 | 1/2005 | Griswold | |
| 7,289,049 B1 | 10/2007 | Fudge et al. | |
| 7,330,027 B2 | 2/2008 | Kozerke et al. | |
| 7,358,730 B2 | 4/2008 | Mistretta et al. | |
| 7,362,843 B2 * | 4/2008 | Basu et al. ....................... | 378/4 |
| 7,408,347 B2 | 8/2008 | Mistretta et al. | |
| 7,519,412 B2 | 4/2009 | Mistretta | |
| 7,545,901 B2 | 6/2009 | Mistretta | |
| 7,558,414 B2 | 7/2009 | Griswold | |
| 7,647,088 B2 | 1/2010 | Mistretta et al. | |
| 7,711,171 B2 * | 5/2010 | Basser et al. .................. | 382/131 |
| 7,902,823 B2 * | 3/2011 | Griswold et al. ............. | 324/307 |
| 7,916,828 B1 * | 3/2011 | Khare et al. ...................... | 378/4 |
| 7,991,452 B2 * | 8/2011 | Mistretta et al. .............. | 600/420 |
| 2005/0018902 A1 * | 1/2005 | Liang ........................... | 382/154 |
| 2006/0029279 A1 | 2/2006 | Donoho | |
| 2007/0010731 A1 | 1/2007 | Mistretta | |
| 2007/0038073 A1 | 2/2007 | Mistretta | |
| 2007/0106149 A1 | 5/2007 | Mistretta | |
| 2007/0156044 A1 | 7/2007 | Mistretta et al. | |
| 2007/0167707 A1 | 7/2007 | Mistretta et al. | |
| 2007/0167728 A1 | 7/2007 | Mistretta et al. | |

(Continued)

OTHER PUBLICATIONS iterative Image reconstruction in MRI with separate magnitude and phase regularization, jeffrey Fessler; University of Michigan; Mar. 2004.*

(Continued)

*Primary Examiner* — Daniel Mariam
*Assistant Examiner* — Nancy Bitar
(74) *Attorney, Agent, or Firm* — Quarles & Brady LLP

(57) ABSTRACT

A method for reconstructing a high quality image from undersampled image data is provided. The image reconstruction method is applicable to a number of different imaging modalities. Specifically, the present invention provides an image reconstruction method that incorporates an appropriate prior image into the image reconstruction process. One aspect of the invention is to provide an image reconstruction method that produces a time series of desired images indicative of a higher temporal resolution than is ordinarily achievable with the imaging system, while mitigating undesired image artifacts. This is generally achieved by incorporating a limited amount of additional image data into the data consistency condition imposed during a prior image constrained image reconstruction. For example, cardiac phase images can be produced with high temporal resolution using a state-of-the-art multi-detector CT system with either fast gantry rotation speed or CT imaging system with a slow gantry rotation speed.

20 Claims, 12 Drawing Sheets

U.S. PATENT DOCUMENTS

| | | |
|---|---|---|
| 2007/0167729 A1 | 7/2007 | Mistretta et al. |
| 2008/0199063 A1 | 8/2008 | O'Halloran et al. |
| 2008/0219535 A1 | 9/2008 | Mistretta et al. |
| 2009/0076369 A1 | 3/2009 | Mistretta |
| 2009/0129651 A1 | 5/2009 | Zagzebski et al. |
| 2009/0161932 A1 | 6/2009 | Chen |
| 2009/0161933 A1 | 6/2009 | Chen |
| 2009/0175523 A1 | 7/2009 | Chen |
| 2009/0262996 A1* | 10/2009 | Samsonov et al. ............ 382/130 |
| 2009/0274355 A1 | 11/2009 | Chen |

OTHER PUBLICATIONS

Sparsified Prior Bases iterative image reconstruction for retrospectively Gated cardiac Micro-CT. Jiayu Song et al; Nov. 2007.*

Image Recovery in Computer Tomography from Partial Fan-Beam Data by Convex Projections; Hui Peng et al. Dec. 1992.*

Fessler, et al., "Iterative Image Reconstruction in MRI With Separate Magnitude And Phase Regularization," IEEE International Symposium on Biomedical Imaging: Nano to Macro, 2004; 1:209-212.

Lustig, et al., "Rapid MR Imaging with 'Compressed Sensing' and Randomly Under-Sampled 3DFT Trajectories", Proc. Intl. Soc. Mag. Reson. Med. 14 (2006), p. 695.

Mistretta, et al., "Highly Constrained Backprojection for Time-Resolved MRI", Magn Reson Med, 2006, 55(1):30-40.

Donoho, "Compressed Sensing", Sep. 14, 2004, pp. 1-34.

Schmidt, "Least Squares Optimization with L1-Norm Regularization", Dec. 2005, pp. 1-12.

O'Halloran, et al., "Iterative Projection Reconstruction of Time-Resolved Images Using Highly-Constrained Back-Projection (HYPR)", Magn Reson Med, 2008, 59:132-139 (published online Dec. 3, 2007).

Michael Lustig et al: Compressed Sensing MRI; 18 pages.

Michael B Smith; Sparse MRI: The Application of Compressed Sensing for Rapid MR Imaging; Magnetic Resonance in Medicine58:1182-1195 (2007).

Jiayu Song et al: Sparseness Prior Based Iterative Image Reconstruction For Retrospectively Gated Cardiac micro-CT; Med. Phys. 34 (11) Nov. 2007; Am. Assoc. Phys. Med.; pp. 4476-4483.

David L Donoho: Compressed Sensing; IEEE Transactions on Information Theory, vol. 52, No. 4, Apr. 2006; pp. 1289-1306.

Emmanuel J Candes et al: Robust Uncertainty Principles: Exact Signal Reconstruction From Highly Incomplete Frequency Information; IEEE Transactions on Information Theory, vol. 52, No. 2, Feb. 2006; pp. 489-509.

Brian Nett et al; Tomosynthesis via Total Variation Minimization Reconstruction and Prior Image Constrained Compressed Sensing (PICCS) on a C-arm System; Proc Soc Photo Opt Instrum Eng. Mar. 18, 2008; 6913: nihpa92672. doi:10.1117/12.771294.

Guang-Hong Chen; Prior Image Constrained Compressed Sensing (PICCS); Proc Soc Photo Opt Instrum Eng. Mar. 3, 2008; 6856: 685618. doi:10.1117/12.770532.

Guang-Hong Chen et al; Prior image constrained compressed sensing (PICCS): A method to accurately reconstruct dynamic CT images from highly undersampled projection data sets; Med Phys. Feb. 2008; 35(2): 660-663.

* cited by examiner

METHOD FOR DYNAMIC PRIOR IMAGE CONSTRAINED IMAGE RECONSTRUCTION

STATEMENT REGARDING FEDERALLY SPONSORED RESEARCH

This invention was made with United States government support awarded by the following agency: National Institutes of Health, NIH EB005712. The United States government has certain rights in this invention.

CROSS-REFERENCE TO RELATED APPLICATIONS

None.

BACKGROUND OF THE INVENTION

The field of the invention is medical imaging and particularly, methods for reconstructing images from acquired image data.

In a computed tomography system, an x-ray source projects a fan-shaped beam which is collimated to lie within an x-y plane of a Cartesian coordinate system, termed the "image plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce what is called the "transmission profile," "attenuation profile," or "projection."

The source and detector array in a conventional CT system are rotated on a gantry within the imaging plane and around the object so that the angle at which the x-ray beam intersects the object constantly changes. The transmission profile from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This image reconstruction process converts the attenuation measurements acquired during a scan into integers called "CT numbers" or "Hounsfield units", which are used to control the brightness of a corresponding pixel on a display.

In general, cardiac CT imaging is a particularly demanding task. For example, sub-millimeter isotropic spatial resolution is necessary in order to visualize the small branches of the coronary arteries. Initially, computed tomography of the heart was performed by electron beam CT ("EBCT") without contrast media to assess coronary calcifications. The lack of moving parts enables EBCT to achieve scan times of 50 milliseconds or less. While EBCT acquisition provides high temporal resolution, it suffers from low spatial resolution, for example, 1.2 millimeter in-plane resolution with 3 millimeter slice thickness. In recent years, tremendous improvements have been made in conventional rotating-gantry CT. In the state-of-the-art 64-slice, or 320-slice, multi-row detector CT ("MDCT"), $0.6 \times 0.6 \times 0.6$ mm$^3$ isotropic spatial resolution is achievable. Moreover, a state-of-the-art CT gantry may revolve at 0.27 seconds per revolution for single source-detector system, which allows for cardiac imaging with 150 millisecond temporal resolution.

According to standard image reconstruction theories, in order to reconstruct an image without aliasing artifacts, the sampling rate employed to acquire image data must satisfy the so-called Nyquist criterion, which is set forth in the Nyquist-Shannon sampling theorem. Moreover, in standard image reconstruction theories, no specific prior information about the image is needed. On the other hand, when some prior information about the desired image is available and appropriately incorporated into the image reconstruction procedure, an image can be accurately reconstructed even if the Nyquist criterion is violated. For example, if one knows a desired image is circularly symmetric and spatially uniform, only one view of parallel-beam projections (i.e., one projection view) is needed to accurately reconstruct the linear attenuation coefficient of the object. As another example, if one knows that a desired image consists of only a single point, then only two orthogonal projections that intersect at said point are needed to accurately reconstruct the image point. Thus, if prior information is known about the desired image, such as if the desired image is a set of sparsely distributed points, it can be reconstructed from a set of data that was acquired in a manner that does not satisfy the Nyquist criterion. Put more generally, knowledge about the sparsity of the desired image can be employed to relax the Nyquist criterion; however, it is a highly nontrivial task to generalize these arguments to formulate a rigorous image reconstruction theory.

The Nyquist criterion serves as one of the paramount foundations of the field of information science. However, it also plays a pivotal role in modern medical imaging modalities such as magnetic resonance imaging ("MRI") and x-ray computed tomography ("CT"). When the number of data samples acquired by an imaging system is less than the requirement imposed by the Nyquist criterion, artifacts appear in the reconstructed images. In general, such image artifacts include aliasing and streaking artifacts. In practice, the Nyquist criterion is often violated, whether intentionally or through unavoidable circumstances. For example, in order to shorten the data acquisition time in a time-resolved MR angiography study, undersampled projection reconstruction, or radial, acquisition methods are often intentionally introduced.

The risks associated with exposure to the ionizing radiation used in medical imaging, including x-ray computed tomography ("CT") and nuclear myocardial perfusion imaging ("MPI"), have increasingly become a great concern in recent years as the number CT and nuclear MPI studies has dramatically increased. The reported effective radiation dose from a cardiac CT angiography session is approximately 5-20 millisievert ("mSv") for male patients and even higher for female patients. This dose is in addition to the smaller radiation dose from the calcium scoring CT scan that is routinely performed prior to intravenous contrast injection. To perform CT-MPI as part of a comprehensive cardiac CT study would require acquiring images over the same region of the heart approximately 20-30 times, resulting in an increase in radiation dose of approximately twenty- to thirty-fold, which is an unacceptable level of radiation exposure.

Additional major limitations exist with current cardiovascular CT imaging. In particular, current cardiac CT imaging methods suffer from inadequate temporal resolution to provide high quality cardiac images in all patient subsets. Thus, improving temporal resolution with CT cardiovascular imaging enables more accurate diagnoses and potentially safer, more effective therapeutic interventions.

Despite the short gantry rotation time of current state-of-the-art multi-detector CT ("MDCT") imaging systems, the temporal aperture is inadequate to accurately measure global function (ejection fraction), assess wall motion abnormalities, or freeze valve motion to assess valvular abnormalities. In general, the temporal aperture should be no longer than 40-50 milliseconds in order to accurately assess global function and local wall motion abnormalities. In addition, despite current short gantry rotation times, pharmacological intervention (e.g., the administration of beta blockers) is often needed to slow the heart rate sufficiently in order to acquire images free from motion artifacts. This presents a limitation in the use of such a method since beta blockers are contraindicated in patients with impaired heart conduction and pulmonary disease, such as asthma. These are additional barriers for wider implementation of cardiac CT angiography.

In MDCT, the temporal resolution is primarily limited by the gantry rotation speed. In order to accurately reconstruct an image, the projection data is typically acquired over an angular range of 180 degrees, and greater. This angular range covers about two-thirds of a complete circle. After the incorporation of an appropriate weighting function in the employed image reconstruction algorithm, the typical temporal aperture of MDCT is limited to 50 percent of the gantry rotation time for a complete rotation. The temporal resolution and corresponding gantry rotation speed for the state-of-the-art MDCT scanners are summarized below in Table 1.

TABLE 1

Temporal Resolution Chart

| Gantry Rotation Speed | X-ray Source Type | Temporal Resolution |
|---|---|---|
| 350 ms | Single | 175 ms |
| 350 ms | Dual | 87 ms |
| 270 ms | Single | 135 ms |

In cardiac MDCT imaging, to achieve better than 20 milliseconds temporal resolution, a gantry rotation period on the order of 50 milliseconds is required, which is currently infeasible due to mechanical limitations of CT imaging systems. Since the gantry speed is limited, segmented reconstruction has been investigated to improve temporal resolution. In segmented reconstruction, the data coverage required for a single reconstruction is filled with projection data selected from different heartbeats at the same cardiac phase. Using segmented reconstruction, the temporal resolution may be improved.

In the best case scenario, the temporal resolution can be improved by a factor of N (where N is the number of sectors utilized). However, segmented reconstruction is highly dependent on the consistency of the heart motion from one cycle to the next. It is noted that the gantry rotates several times during a single heart beat. When multiple heart beats are needed for segmented reconstruction, the projection data are distributed over many gantry rotations. Thus, due to the possible synchronization between the gantry rotation and the heart beat, the segments selected from different heartbeats often do not combine to produce a short-scan dataset. Therefore, the union of the segmented data sets does not provide a complete projection data set for an accurate image reconstruction. As a result, the promise of temporal resolution improvement in segmented reconstruction is not reliably achieved and, thus, the segmented reconstruction method is rarely utilized in clinical practice.

It would therefore be desirable to provide a method for reconstructing an image of a dynamic subject, such as the beating heart, with a temporal resolution on the order of 40 milliseconds the produces images substantially free of undesired image artifacts.

SUMMARY OF THE INVENTION

The present invention provides an image reconstruction method applicable to a number of different imaging modalities including x-ray computed tomography ("CT"), x-ray C-arm imaging, magnetic resonance imaging ("MRI"), positron emission tomography ("PET"), and single photon emission computed tomography ("SPECT"). More specifically, the present invention provides an image reconstruction method that combines the merits of accurate reconstruction with a gain in signal-to-noise ratio ("SNR") by incorporating an appropriate prior image of the subject into the image reconstruction process. In addition to the increased SNR, the method of the present invention provides an increase in temporal resolution. Moreover, for a given desired image and a given number of projections, the method of the present invention provides accurate image reconstruction where previous image reconstruction methods, such as compressed sensing ("CS") fail.

One aspect of the present invention provides a method for producing a time series of images indicative of a higher temporal resolution than the temporal resolution at which the corresponding image data was acquired. For example, the present invention provides a method for high temporal resolution cardiac imaging. For cardiac CT, a slow gantry rotation data acquisition is employed. More specifically, high temporal resolution is achievable that significantly improves the diagnostic accuracy of coronary CT angiography and measurement of cardiac function. Moreover, by using a slow gantry rotation during a single breath-hold, problems with view angle synchronization are significantly reduced. Increased temporal resolution is also achievable in MR imaging applications. The increase in temporal resolution is achieved while mitigating undesired image artifacts by incorporating image data not associated with a current time frame into a data consistency condition during the reconstruction of the image frame corresponding to the current time frame. The expanded image frame data set that is formed in this manner includes, for example, 5-15 percent of data acquired that is not associated with the current time frame.

Another aspect of the present invention provides a fundamentally different way to increase temporal resolution for a conventional multi-detector CT ("MDCT") scanner with a fast gantry rotation data acquisition system. More specifically, a target reconstruction window for a conventional filtered backprojection image reconstruction is divided into several subwindows, or "time windows". The present invention provides a way to reconstruct images using the data from each subwindow. This method of temporal resolution improvement is also achievable for slow gantry rotation CT imaging and MR imaging applications.

Another aspect of the present invention provides a fundamentally different form of segmented acquisition, where individual projections are segmented into to different cardiac phases, without the need to synchronize the gantry angle, or other data acquisitions, with the appropriate cardiac phase. In this way, excellent image quality can be achieved with the benefits of improved temporal resolution of segmented acquisitions. For example, in conventional multi-detector CT ("MDCT"), an irregular heart beat causes data gaps and overlap between different sectors. However, when practicing the present invention, an irregular heart beat only leads to a non-uniform distribution of the highly undersampled data set for each cardiac phase. This is true without dependence on the particular imaging modality utilized. This non-uniformity has very little effect on the images reconstructed in accordance with the present invention.

Yet another aspect of the present invention provides an accurate image reconstruction in cardiac imaging without a constraint on the patient's heart rate. In general, the higher a patient's heart rate, the more acquired projections available for each cardiac phase. Thus, improved image quality is achievable using the image reconstruction method of the present invention. More notably, an immediate clinical significance is that beta blockers are not required to be prescribed to the patient practicing the method of the present invention.

Yet another aspect of the present invention provides that the same imaging system utilized during catheter-based interventional procedures can be employed to produce a time-resolved four-dimensional cardiac "roadmap." This alleviates the need for tedious 3D-to-2D image registration during interventional procedures. This will be advantageous for hospitals in terms of imaging system space and resource allocation, in addition to more efficient patient throughput from a definitive diagnosis to a successful treatment.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
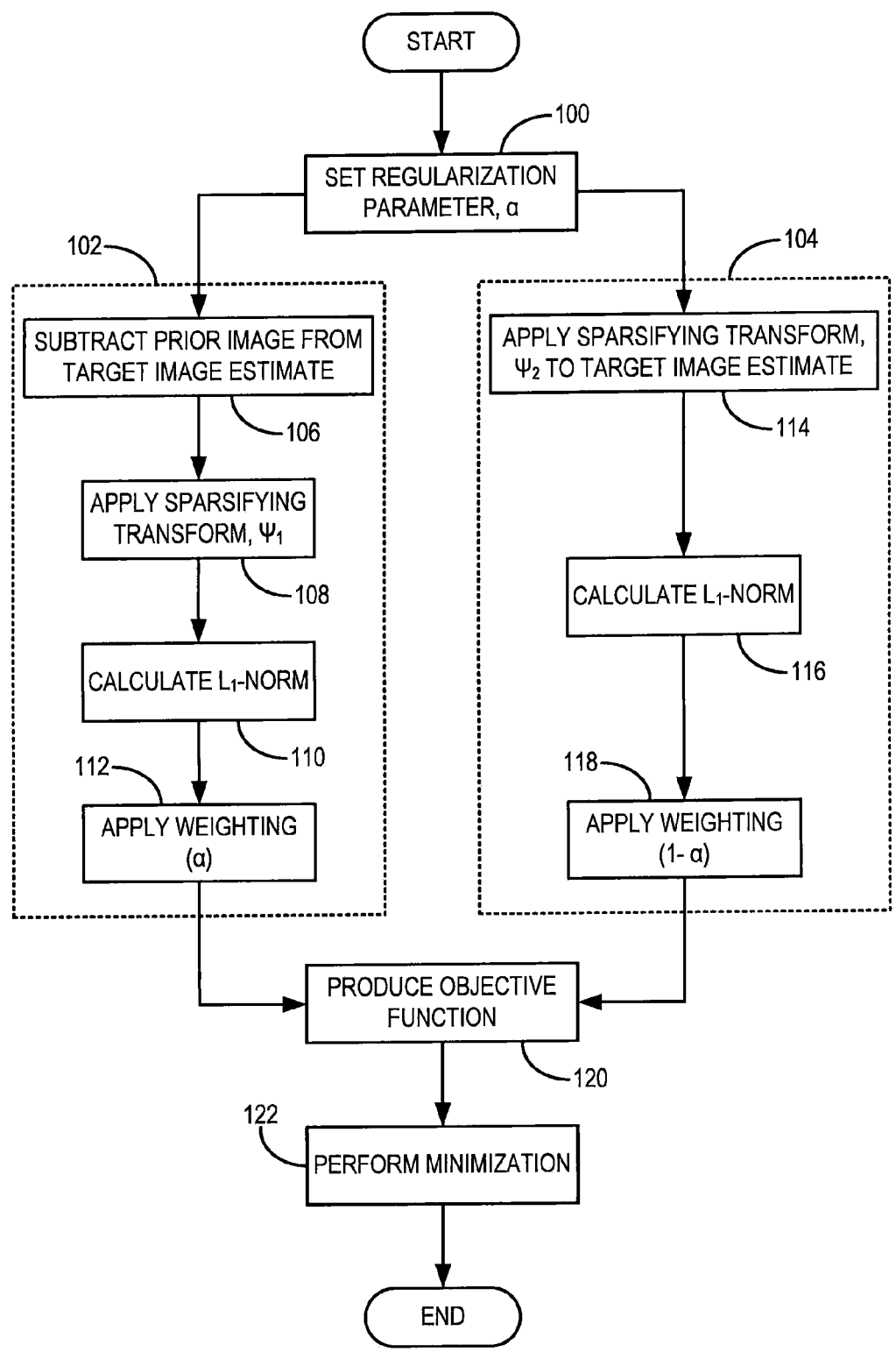
FIG. 1 is a flowchart setting forth the steps of an exemplary image reconstruction method employed when practicing the present invention.

Generally speaking, the method of reconstructing an image from a set of data includes a series of numerical steps to estimate a desired image, I, from the measured data samples, Y. More specifically, the image reconstruction should fulfill the following consistency condition:

$$AI=Y \qquad \text{Eqn. (1);}$$

where A is a system matrix. In general, the system matrix, A, can be viewed as a forward projection operator that relates the desired image, I, to the acquired data samples, Y. When dealing with computed tomography ("CT") imaging, the system matrix can include a reprojection operation, while in magnetic resonance imaging ("MRI"), it can include a Fourier transform operation. The consistency condition of Eqn. (1), put in other words, states that when an image is faithfully reconstructed, the forward operation should substantially mimic the actual data acquisition procedure in order to generate a correct estimate of the measured projection data.

Turning now to the method of the present invention, a method for reconstructing a quality desired image is provided. In general, a "prior image" is employed to constrain an iterative image reconstruction method, in which the principles of compressed sensing ("CS") are utilized. For example, in addition to the sparsifying transforms commonly used in CS, an image is further sparsified by subtracting the prior image from the desired image. As a result, an image can be accurately reconstructed using a substantially fewer number of samples than required by CS methods.

More specifically, given a prior image, $I_P$, and a desired image to be reconstructed, I, the method of the present invention for image reconstruction is implemented by minimizing the following objective function:

$$\alpha\|\Psi_1(I-I_P)\|_1+(1-\alpha)\|\Psi_2 I\|_1 \qquad \text{Eqn. (2);}$$

where $\Psi_1$ and $\Psi_2$ are sparsifying transforms, $\|\ldots\|_1$ is an $L_1$-norm operation, and $\alpha$ is a regularization parameter that is utilized to control the relative weight of the two terms in the objective function of Eqn. (2). As noted above, $$\|x\|_1 = \sum_{i=1}^{N} |x_i|; \qquad \text{Eqn. (3)}$$

indicates the $L_1$-norm of an N-dimensional vector, x. More generally, a deviation from the true $L_1$-norm is possible while still maintaining adequate image quality in the desired image. For example, the objective function of Eqn. (2) can be generalized as:

$$\alpha\|\Psi_1(I-I_P)\|_p+(1-\alpha)\|\Psi_2 I\|_p, \qquad \text{Eqn. (4);}$$

where $\|\ldots\|_p$ is an $L_p$-norm operation having the form:

$$\|x\|_p = \left(\sum_{i=1}^{N} |x_i|^p\right)^{1/p}. \qquad \text{Eqn. (5)}$$

As noted above, preferably p=1.0; however, in the alternative, different values of p are possible. It should be appreciated by those skilled in the art that the further the value of p deviates from p=1.0, generally, the more degradation will be evident in the reconstructed desired image.

The sparsifying transforms in Eqn. (2), $\Psi_1$ and $\Psi_2$, are, in general, different; however, in the alternative, $\Psi_1$ and $\Psi_2$ may be the same sparsifying transform. Exemplary sparsifying transforms include a wavelet transform, a first order finite difference, a second order finite difference, and a discrete gradient transform, such as, for example, a discrete gradient transform, $\nabla_{m,n}$, having the following form:

$$\nabla_{m,n} I(m,n) = \sqrt{\begin{array}{l}[I(m+1,n) - I(m,n)]^2 + \\ [I(m,n+1) - I(m,n)]^2\end{array}} \; ; \qquad \text{Eqn. (6)}$$

where the indices m and n indicate the location of a pixel in an image, I. The image specified as $\nabla_{m,n}I(m,n)$ is commonly referred to as the "gradient image."

Both of the terms in the objective function of Eqn. (2) are important. As a result of their importance, the selection of the regularization parameter, $\alpha$, is utilized to control the overall image reconstruction process. Therefore, the selection of the regularization parameter, $\alpha$, will depend on the choice of the prior image, $I_P$, and also the clinical application at hand. For example, the second term in the objective function of Eqn. (2), $(1-\alpha)\|\Psi_2 I\|_1$, mitigates streaking artifacts that are potentially inherited from the prior image, $I_P$. For further example, selecting a regularization parameter of $\alpha \approx 0.3$–$0.7$ is generally sufficient for cardiac imaging applications.

To better incorporate the consistency condition of Eqn. (1) into the overall image reconstruction, the method of Lagrange multipliers is utilized. In such a manner, the consistency condition is employed to add a further constraint on the minimization of the objective function set forth in Eqn. (2). A new objective function is thus produced, which has the form:

$$\alpha\|\Psi_1(I-I_P)\|_1 + (1-\alpha)\|\Psi_2 I\|_1 + \lambda\|X\|_2^2 \qquad \text{(Eqn. 7)};$$

where $\lambda$ is the Lagrange multiplier, X is a difference matrix, and $\|\ldots\|_2^2$ is a squared $L_2$-norm operation, which, for an N-dimensional vector, x, has the form:

$$\|x\|_2^2 = \sum_{i=1}^N x_i^2. \qquad \text{Eqn. (8)}$$

The difference matrix in Eqn. (7) accounts for the consistency condition of Eqn. (1), and has the following form:

$$X = AI - Y \qquad \text{Eqn. (9)}.$$

The Lagrange multiplier, $\lambda$, is determined empirically for the particular imaging system employed when practicing the present invention. For example, the Lagrange multiplier, $\lambda$, is determined by a pre-determined tradeoff between the desired data consistency requirement and the similarity to the prior image, $I_P$. When a large Lagrange multiplier, $\lambda$, is selected, the reconstructed image has lower noise variance; however, this may be achieved as a loss of the high spatial resolution characteristic of the prior image. Similarly, when a smaller Lagrange multiplier, $\lambda$, is used, the high spatial resolution characteristic of the prior image is well preserved, but the noise variance can be high in the desired image. Such a situation affects the contrast-to-noise ratio achievable by the imaging system utilized.

The objective function presented in Eqn. (7) can further be altered in order to account for noise of the imaging system. In such a manner, the following objective function is minimized:

$$\alpha\|\Psi_1(I-I_P)\|_1 + (1-\alpha)\|\Psi_2 I\|_1 + \lambda(X^T D X) \qquad \text{Eqn. (10)};$$

where $X^T$ is the transpose of the difference matrix, X, and D is a system noise matrix, which is a diagonal matrix having the following matrix elements:

$$D_{ij} = \begin{cases} \dfrac{1}{\sigma_n^2} & \text{if } i = j \\ 0 & \text{if } i \neq j, \end{cases} \qquad \text{Eqn. (11)}$$

where $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. Alternatively, in an MR imaging system, the noise parameter, $\sigma_n^2$, is estimated noise variance in the $n^{th}$ receiver coil.

In the method of the present invention, the prior image, $I_P$, plays two roles. First, it serves as a seed image in the iterative reconstruction, which accelerates the overall image reconstruction method. In addition, the prior image, $I_P$, is employed to further sparsify the desired image, I, and, thus, serves as yet another sparsifying transform. A brief discussion of possible prior images, $I_P$, is provided below with respect to different imaging modalities; however, it should be appreciated by those skilled in the art that prior images, $I_P$, other than those expressly described herein can be employed depending on the clinical application. As referred to herein, a prior image, $I_P$, is an image of the subject that includes a priori information indicative of the desired image to be reconstructed. The prior image, $I_P$, can be from a previously performed imaging study, or can be reconstructed from image data acquired in the same session as the image data acquired for the desired images. Typically, the prior image, $I_P$, is acquired using the same imaging modality as the desired images; however, as will be described below, there are applications where the prior image, $I_P$, can be obtained from a different imaging modality than the desired images.

With reference now to FIG. 1, one implementation of the method of the present invention employs the objective function of Eqn. (2), and begins by initializing the regularization parameter, $\alpha$, as indicated at step 100. The choice of the regularization parameter, $\alpha$, determines the trade-off between the sparsity of the desired image, and the influence of the prior image on the desired image. Accordingly, the value of the regularization parameter, $\alpha$, will vary depending on the clinical application at hand. For example, a value of $\alpha \approx 0.3$-$0.7$ is generally sufficient for cardiac imaging applications. Subsequently, the first and second terms in the objective function of Eqn. (2) are initialized, as indicated in steps 102 and 104, respectively. The initialization of the first term, $\alpha\|\Psi_1(I-I_P)\|_1$, begins at step 106 where the prior image, $I_P$, is subtracted from an estimate of the desired image, I, to produce a "difference image." The particular choice of the prior image, $I_P$, and the estimate of the desired image, I, will depend on the imaging modality and the particular clinical application. Accordingly, different alternatives for these choices will be discussed in detail below. The difference image is subsequently sparsified by applying the sparsifying transform, $\Psi_1$, as indicated at step 108. As described above, the sparsifying transform, $\Psi_1$, can be any number of mathematical operations, including a wavelet transform, a first order finite difference, a second order finite difference, and a discrete gradient transform. The $L_1$-norm of this sparsified difference image is then calculated at step 110. The result of this process is then weighted by the regularization parameter, $\alpha$, as indicated at step 112.

The initialization of the second term in the objective function of Eqn. (2), $(1-\alpha)\|\Psi_2 I\|_1$, begins at step 114 where the estimate of the desired image, I, is sparsified through the application of the sparsifying transform, $\Psi_2$. Subsequently, the $L_1$-norm of this sparsified desired image estimate is calculated at step 116. When the discrete gradient transform, $\nabla_{m,n}$, is selected as the sparsifying transform, $\Psi_2$, steps 114 and 116 can be viewed as calculating the total variation, TV, of the desired image estimate, which has the form:

$$TV(I) = \|\nabla I\|_1 = \Sigma |\nabla I| \qquad \text{Eqn. (12)}.$$

After the $L_1$-norm of the sparsified desired image estimate is calculated, the result is weighted by $(1-\alpha)$, as indicated at step 118. The objective function of Eqn. (2) is subsequently produced in step 120 by adding the first and second terms together. This objective function is then minimized, as indicated at step 122, using, for example, a nonlinear conjugate gradient method. The minimization process proceeds until a stopping criterion is satisfied. The stopping criterion includes, for example, comparing the current estimate of the desired image with the estimate of the desired image from the previous iteration. Such a stopping criterion has the following form:

$$\sum_i \sum_j (I_{ij}^{(k+1)} - I_{ij}^{(k)})^2; \qquad \text{Eqn. (13)}$$

where, $I_{ij}^{(k+1)}$ is the value of the $(k+1)^{th}$ estimate of the desired image at the pixel location (i,j), and $I_{ij}^{(k)}$ is the value of the $k^{th}$ estimate of the desired image at the pixel location (i,j).

Figure 2:
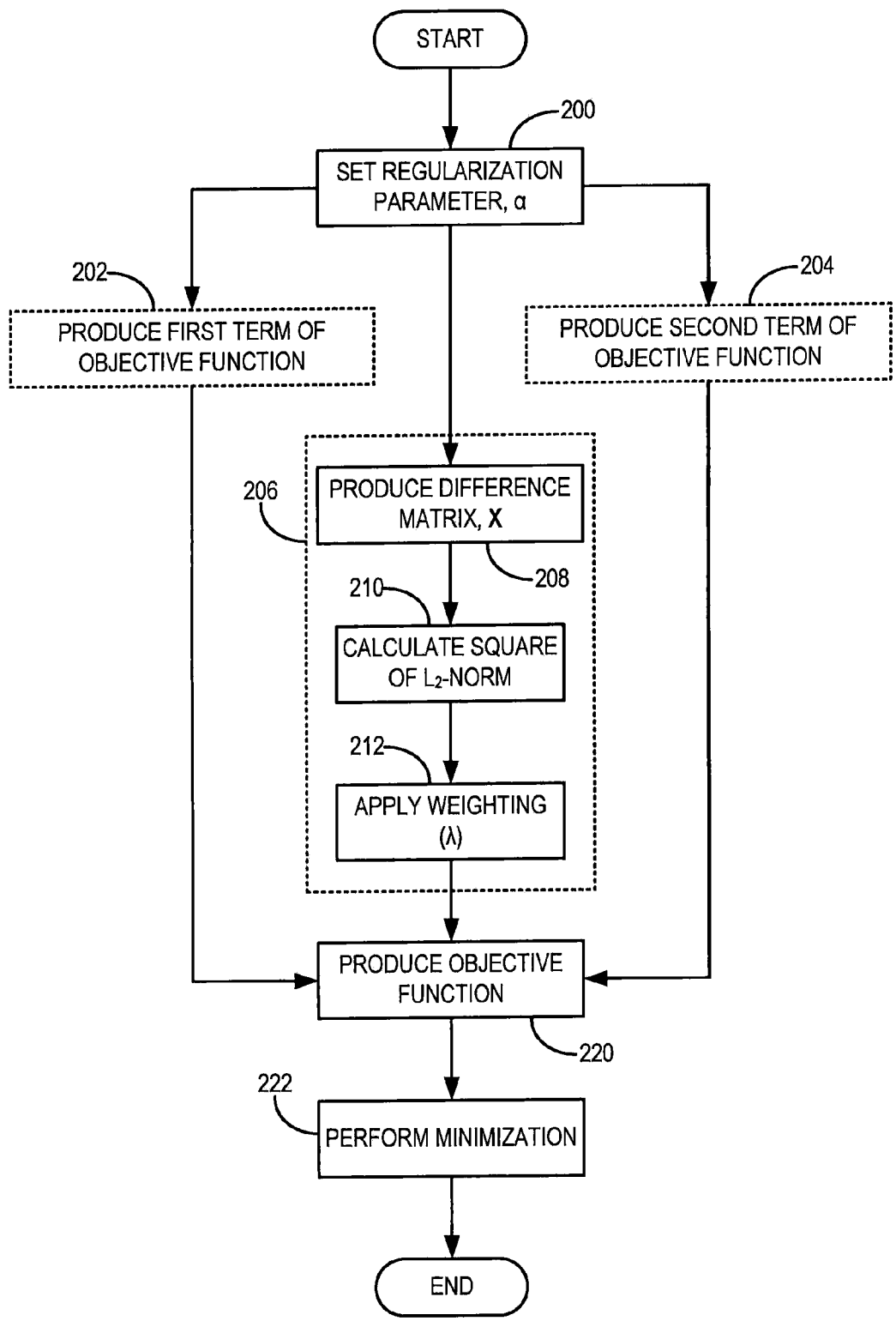
FIG. 2 is a flowchart setting forth the steps of another exemplary image reconstruction method employed when practicing the present invention.

With reference now to FIG. 2, another implementation of the method of the present invention employs the objective function of Eqn. (7), and begins by initializing the regularization parameter, $\alpha$, as indicated at step 200. Subsequently, the first and second terms in the objective function of Eqn. (7) are initialized, as indicated in steps 202 and 204, respectively. This process proceeds in the same manner as described above with reference to steps 102 and 104 in FIG. 1. Now, however, the consistency condition of Eqn. (1) is incorporated into a third term, $\lambda \|X\|_2^2$, which is initialized at step 206. First, the difference matrix, X, is produced, as indicated at step 208. As described above in detail, the difference matrix, X, corresponds to the consistency condition of Eqn. (1) and has the following form:

$$X = AI - Y \qquad \text{Eqn. (14)}.$$

Thus, the difference matrix is determined by applying the system matrix, A, to the estimate of the desired image, I, and subsequently subtracting the acquired image data, Y, that corresponds to the desired image. The square of the $L_2$-norm of the difference matrix, X, is calculated next at step 210. After the square of the $L_2$-norm of the difference matrix, X, has been produced, the Lagrange multiplier, $\lambda$, is determined and employed to weight the difference matrix, X, as indicated at step 212. As described above, the Lagrange multiplier is empirically determined by and the value selected by the user based on the clinical application at hand. The objective function of Eqn. (7) is subsequently produced in step 220 by adding the first, second, and third terms together. This objective function is then minimized, as indicated at step 222, using, for example, a nonlinear conjugate gradient method. The minimization process proceeds until a stopping criterion is satisfied, as described above.

Figure 3:
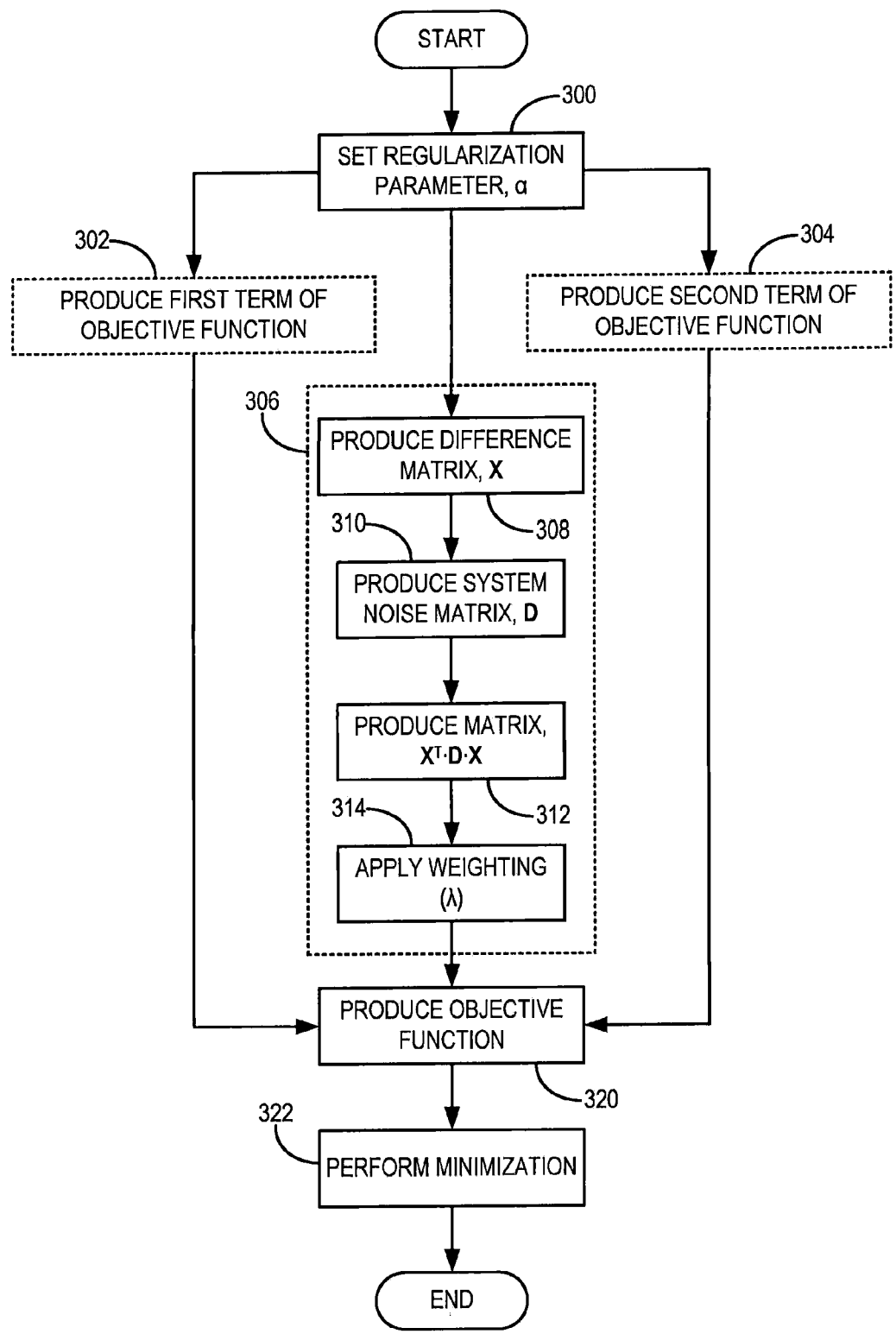
FIG. 3 is a flowchart setting forth the steps of yet another exemplary image reconstruction method employed when practicing the present invention.

With reference now to FIG. 3, yet another implementation of the method of the present invention employs the objective function of Eqn. (10), and begins by initializing the regularization parameter, $\alpha$, as indicated at step 300. Subsequently, the first and second terms in the objective function of Eqn. (10) are initialized, as indicated in steps 302 and 304, respectively. This process proceeds in the same manner as described above with reference to steps 102 and 104 in FIG. 1. Now, however, the consistency condition of Eqn. (1) and the effects of noise in the imaging system are incorporated into a third term, $\lambda(X^T DX)$, which is initialized at step 306. First, the difference matrix, X, is produced, as indicated at step 308, and described above with reference to step 208 in FIG. 2. Next, a system noise matrix, D, is produced, as indicated in step 310. The system noise matrix, D, is a diagonal matrix having matrix elements determined in accordance with the following:

$$D_{ij} = \begin{cases} \dfrac{1}{\sigma_n^2} & \text{if } i = j \\ 0 & \text{if } i \neq j. \end{cases} \qquad \text{Eqn. (15)}$$

As described above, $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. Alternatively, in an MR imaging system, the noise parameter, $\sigma_n^2$, is estimated noise variance in the $n^{th}$ receiver coil. After the system noise matrix, D, has been produced, the following matrix multiplication is performed:

$$X^T DX \qquad \text{Eqn. (16)};$$

as indicated at step 312. The result of this operation is subsequently scaled by the Lagrange multiplier, as indicated at step 314. The objective function of Eqn. (10) is subsequently produced in step 320 by adding the first, second, and third terms together. This objective function is then minimized, as indicated at step 322, using, for example, a nonlinear conjugate gradient method. The minimization process proceeds until a stopping criterion is satisfied, as described above.

Figure 4A:
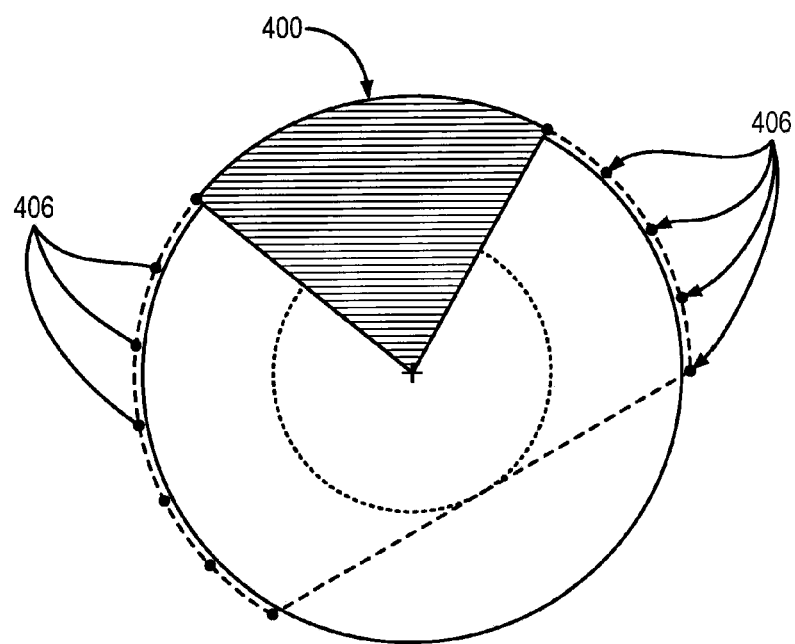
FIG. 4 is a graphic illustration of the formation of an expanded image frame data set.
Figure 4B:
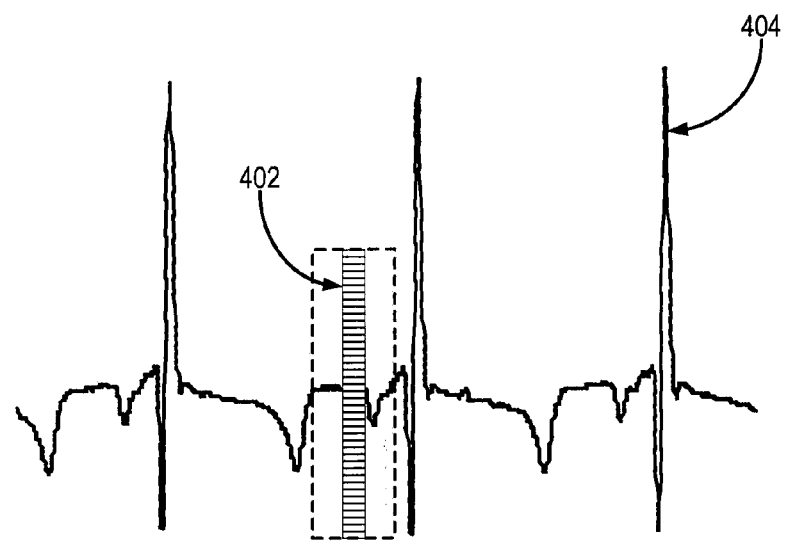

By way of example, a time series of x-ray image data acquired using a so-called "short-scan" acquisition technique during a cardiac imaging study is illustrated in FIG. 4A. In an exemplary short-scan data acquisition, x-ray image data is acquired along a series of projection views that are distributed over a 240 degree angular range (180 degrees plus a full fan angle). During such an acquisition, an electrocardiograph ("ECG") signal is contemporaneously recorded. An exemplary ECG signal is shown in FIG. 4B. When utilizing a short-scan data acquisition, a prior image can be reconstructed without limited view angle shading artifacts; however, the temporal resolution of this image is limited. To improve the temporal resolution, projection data within an angular range that is around half or less of the abovementioned "short-scan" range is utilized. In using, for example, half of the acquired data conventional filtered backprojection reconstruction or other iterative image reconstruction methods will yield an image riddled with artifacts. However, shading artifacts that traditionally appear when using a limited view angle are mitigated by incorporating a prior image of the subject during image reconstruction using, for example, one of the image reconstruction methods described above with reference to FIGS. 1-3. In this manner, a limited amount of image data associated with a current time frame (shaded region 400), and which is acquired during a target reconstruction window 402 selected using the recorded ECG signal 404, is employed to reconstruct a quality image of the subject at that current time frame. This method provides an increase in temporal resolution while mitigating undesirable image artifacts.

The achievable increase in temporal resolution using these image reconstruction methods is still limited, as using a narrow target reconstruction window 402 to select image data results in the encroachment of shading artifacts in the reconstructed images. However, these shading artifacts are further mitigated by incorporating image data from projection views 406 outside of the target reconstruction window into the data consistency condition of Eqn. (1). Thus, the target reconstruction window is reduced to further improve temporal resolution while adding a small amount of image data from projection views 406 acquired outside the target reconstruction window to mitigate the shading artifacts.

Thus, there is a balance between achievable temporal resolution and the presence of shading artifacts in the reconstructed image frames. For example, temporal resolution is degraded as more image data from outside the target reconstruction window 402 is added to the minimization procedure. However, when around, for example, 5-15 percent of the data outside the target reconstruction window 402 is incorporated in the data consistency condition, the influence in temporal resolution is negligible. The projection views 406 corresponding to the image data outside of the target reconstruction window are preferably distributed substantially evenly over the short-scan angular range; however, distributing the projection views in a non-uniform manner, for example randomly, is also possible.

Figure 5:
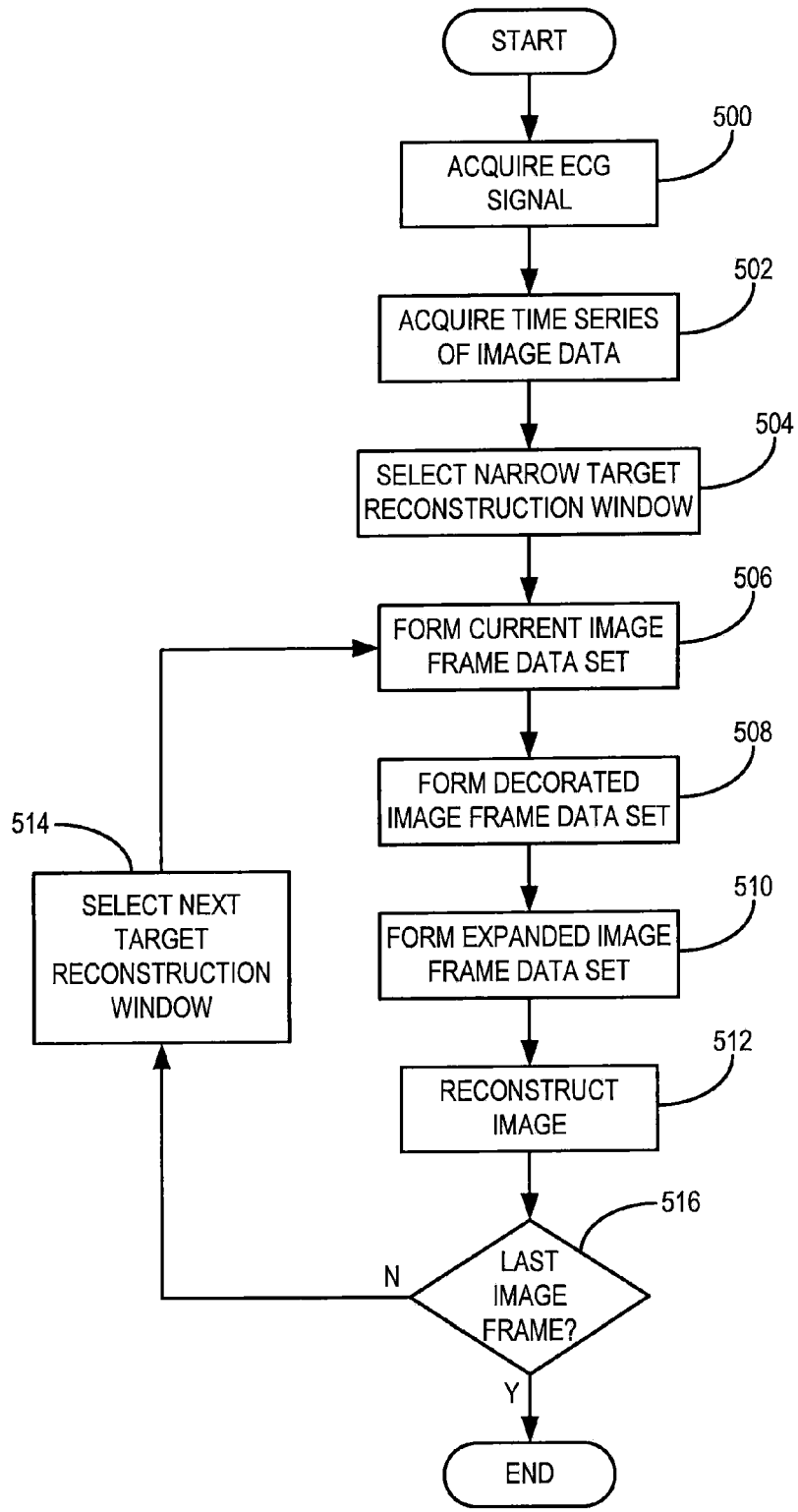
FIG. 5 is a flowchart setting forth the steps of a method for forming an expanded image frame data set in accordance with the present invention.

Referring now particularly to FIG. 5, a method for further increasing the temporal resolution of a cardiac x-ray imaging study while mitigating imaging artifacts includes recording an ECG signal from the subject, as indicated at step 500. As the ECG signal is recorded, a time series of image data is acquired, as indicated at step 502. An exemplary time series of image data includes a plurality of projections views acquired over an angular range of around 240 degrees (180 degrees plus a full fan angle); however, it will be appreciated by those skilled in the art that different angular ranges can alternately be employed. Using the recorded ECG signal, a narrow target reconstruction window is selected, as indicated at step 504. For example, a target reconstruction window having a duration of approximately 78 milliseconds is employed; however, target reconstruction windows having a duration as low as approximately 40 milliseconds can also be employed, while maintaining appreciable image quality. Likewise, it will be appreciated by those skilled in the art that there is no upper limit on the duration of the target reconstruction window, as increasing the size of the target reconstruction window incorporates more image data into the reconstruction process, thereby mitigating the presence of image artifacts.

After the narrow target reconstruction window has been selected, a current image frame data set, $Y_t$, is formed from the image data acquired during the target reconstruction window, as indicated at step 506. Thus, the image data acquired during the target reconstruction window is associated with a current time frame, at which a desired image $I_t$ of the subject is to be reconstructed. In order to reconstruct an image representing the current time frame, $I_t$, with increased temporal resolution and substantially suppressed image artifacts, image data acquired outside of the target reconstruction window is selected to be incorporated into the data consistency condition imposed during image reconstruction. Thus, a decorated image data set, $Y_{dec}$, is formed by selected image data not acquired during the target reconstruction window, as indicated at step 508. For example, around 5-15 percent of the data projection views acquired outside of the target reconstruction window are selected. Preferably, these projection views are selected to be substantially evenly distributed across the short-scan angular range and, therefore, across projection space. However, the projection views selected need not be evenly distributed. Using the current image frame data set, $Y_t$, and the decorated image frame data set, $Y_{dec}$, an expanded image frame data set, $\tilde{Y}$, is formed, as indicated at step 510. For example, the expanded image frame data set, $\tilde{Y}$, is formed by combining the current image frame data set, $Y_t$, and the decorated image frame data set, $Y_{dec}$, by determining the union of the two data sets as follows:

$$\tilde{Y}=Y_t \cup Y_{dec} \qquad \text{Eqn. (17)}.$$

By way of example, when the image data within the target reconstruction window includes around 200-300 view angles, the data outside the target reconstruction window will include around 10-45 view angles. This data is combined together using Eqn. (17) to form an expanded image frame data set that substantially covers the short-scan angular range. When consistency between the forward projection of the reconstructed image and the expanded image frame data set is enforced during image reconstruction, the shading artifacts caused by the limited view angle problem are substantially suppressed. Thus, image reconstruction proceeds using, for example, one of the aforementioned methods while enforcing such a consistency condition by replacing Y with $\tilde{Y}$ where appropriate, as indicated at step 512. For example, when employing the method described above with reference to FIG. 1, the consistency condition of Eqn. (1) is modified as follows:

$$AI=\tilde{Y} \qquad \text{Eqn. (18)};$$

and the objective function of Eqn. (2) otherwise remains unchanged. However, when employing the method described above with reference to FIG. 2, the difference matrix of Eqn. (9) is modified as follows:

$$\tilde{X}=AI-\tilde{Y} \qquad \text{Eqn. (19)};$$

where $\tilde{X}$ is the modified difference matrix. Following this modification, the objective function of Eqn. (7) becomes:

$$\alpha \|\Psi_1(I-I_P)\|_1+(1-\alpha)\|\Psi_2 I\|_1+\lambda \|\tilde{X}y\|_2^2 \qquad \text{Eqn. (20)}.$$

Similarly, when employing the method described above with reference to FIG. 3, the difference matrix of Eqn. (9) is replaced by the modified difference matrix, $\tilde{X}$, of Eqn. (19); thus, the objective function of Eqn. (10) becomes:

$$\alpha \|\Psi_1(I-I_P)\|_1+(1-\alpha)\|\Psi_2 I\|_1+\lambda(\tilde{X}^T D \tilde{X}) \qquad \text{Eqn. (21)}.$$

The foregoing steps are subsequently repeated to reconstruct a plurality of image frames by first selecting a next narrow target reconstruction window, as indicated at step 514. After selecting the new target reconstruction window, steps 508-512 are repeated and a new target reconstruction window selected again until all of the desired image frames of the subject have been reconstructed, as indicated at decision block 516.

The present invention, as described above, may be applied to many different medical imaging modalities and may be utilized in many different clinical applications. A number of such exemplary clinical applications are described below to illustrate the broad scope of the present invention. Such embodiments do not necessarily represent the full scope of the invention, however, and reference is made therefore to the claims and herein for interpreting the scope of the invention.

X-Ray Computed Tomography Imaging System

Figure 6A:
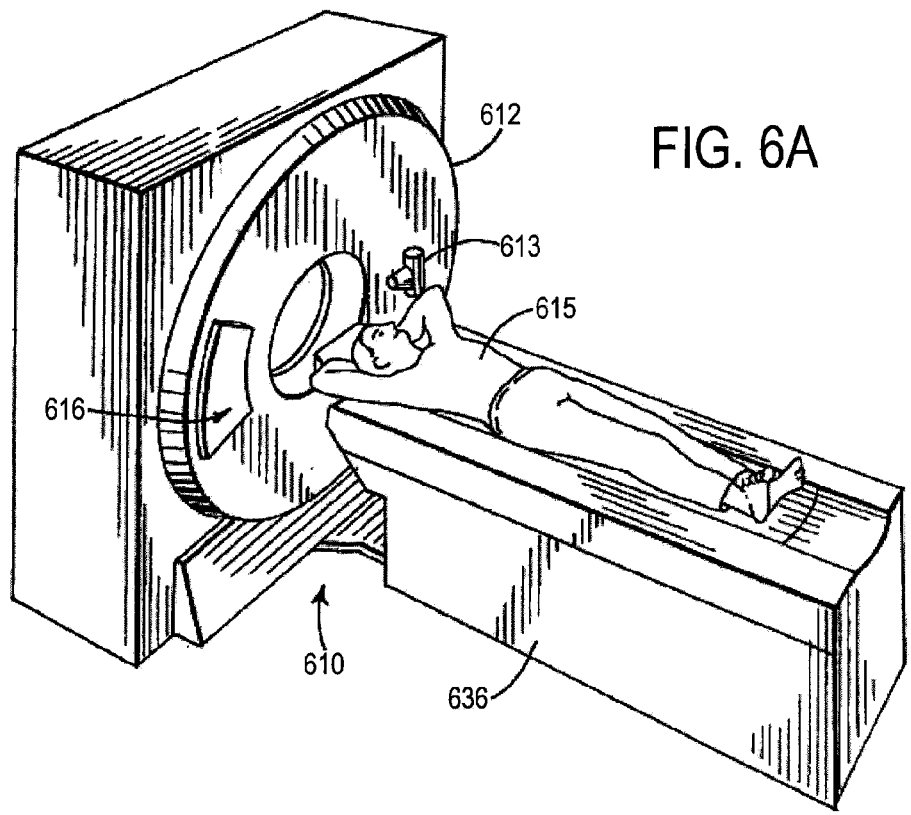
FIG. 6A is a pictorial view of an x-ray computed tomography (CT) imaging system.
Figure 6B:
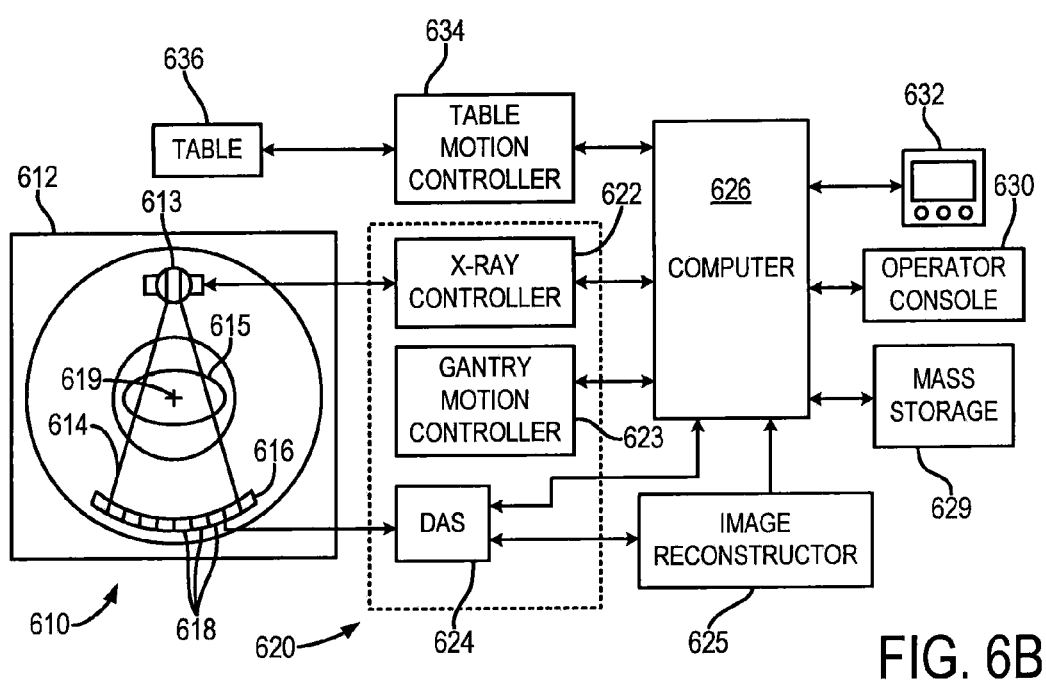
FIG. 6B is a block diagram of the CT imaging system of FIG. 6A.

The present invention is also particularly applicable to other medical imaging modalities in which interleaved projection views of the subject are acquired. One such imaging modality is x-ray computed tomography. With initial reference to FIGS. 6A and 6B, an x-ray computed tomography ("CT") imaging system 610 includes a gantry 612 representative of a "third generation" CT scanner. Gantry 612 has an x-ray source 613 that projects a fan-beam, or cone-beam, of x-rays 614 toward a detector array 616 on the opposite side of the gantry. The detector array 616 is formed by a number of detector elements 618 which together sense the projected x-rays that pass through a medical patient 615. Each detector element 618 produces an electrical signal that represents the intensity of an impinging x-ray beam and hence the attenuation of the beam as it passes through the patient. During a scan to acquire x-ray projection data, the gantry 612 and the components mounted thereon rotate about a center of rotation 619 located within the patient 615.

The rotation of the gantry and the operation of the x-ray source 613 are governed by a control mechanism 620 of the CT system. The control mechanism 620 includes an x-ray controller 622 that provides power and timing signals to the x-ray source 613 and a gantry motor controller 623 that controls the rotational speed and position of the gantry 612. A data acquisition system ("DAS") 624 in the control mechanism 620 samples analog data from detector elements 618 and converts the data to digital signals for subsequent processing. An image reconstructor 625, receives sampled and digitized x-ray data from the DAS 624 and performs high speed image reconstruction. The reconstructed image is applied as an input to a computer 626 which stores the image in a mass storage device 628.

The computer 626 also receives commands and scanning parameters from an operator via console 630 that has a keyboard. An associated display 632 allows the operator to observe the reconstructed image and other data from the computer 626. The operator supplied commands and parameters are used by the computer 626 to provide control signals and information to the DAS 624, the x-ray controller 622 and the gantry motor controller 623. In addition, computer 626 operates a table motor controller 634 which controls a motorized table 636 to position the patient 615 in the gantry 612.

X-Ray Computed Tomography Image Reconstruction

Figure 7A:
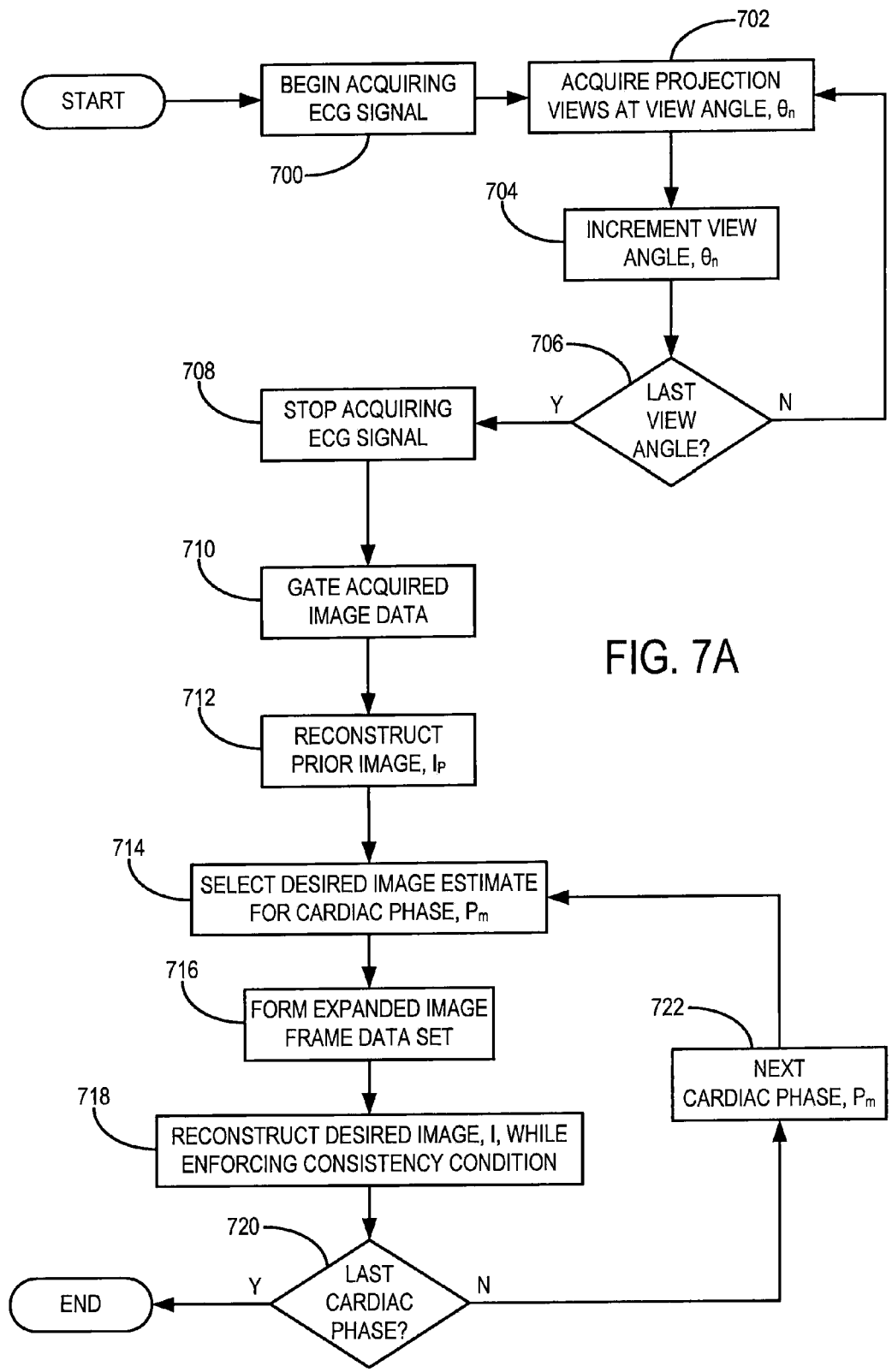
FIG. 7A is a flowchart setting forth the steps of an image reconstruction method that employs the present invention used in the CT system of FIG. 6A.
Figure 8:
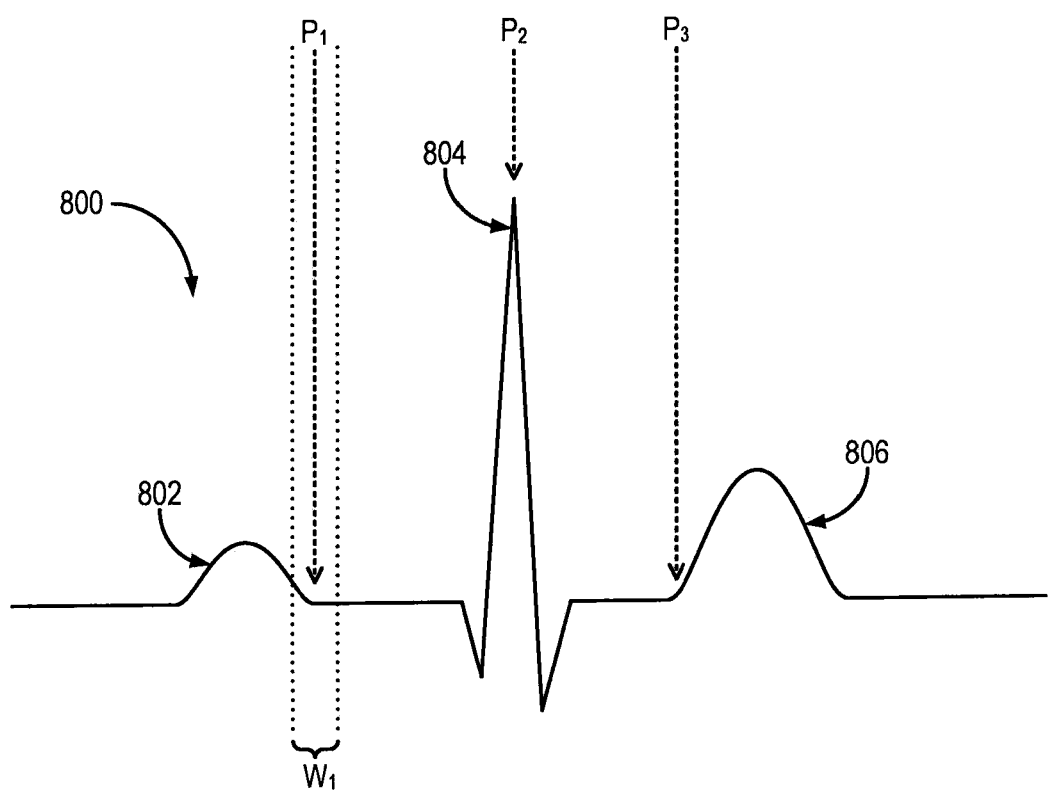
FIG. 8 is a graphic illustration of an exemplary electrocardiogram ("ECG") signal.

Referring now to FIG. 7A, when practiced in a cardiac x-ray CT imaging system, the method of the present invention starts by acquiring a signal indicative of the physiological motion of the subject's heart. For example, the acquisition of an electrocardiogram ("ECG") signal from the subject is initiated, as indicated at step 700. This ECG signal is used to retrospectively gate the acquired image data into M different cardiac phases, $P_M$. For example, and with reference to FIG. 8, three cardiac phases, $P_1$, $P_2$, and $P_3$ can be selected from time points in the ECG signal 800. In this example, the first cardiac phase, $P_1$, is selected as during the isovolumetric contraction phase at the end of the P wave 802; the second cardiac phase, $P_2$, is selected as the beginning of the rapid ejection phase at the peak of the QRS complex 804; and the third cardiac phase, $P_3$, is selected as the beginning of the reduced ejection phase at the beginning of the T wave 806. In general, any number of cardiac phases can be selected and from any time point in the ECG signal.

Referring again to FIG. 7A, data acquisition begins by acquiring image data in the form of a set of projection views at a first view angle, $\theta_n$, as indicated at step 702. The gantry is subsequently rotated to a new view angle at step 704. More image data is subsequently acquired at the new view angle, $\theta_{n+1}$, and this process is repeated until the gantry has been rotated to a last view angle, $\theta_N$, as indicated by decision block 706. After all of the desired image data has been acquired, the acquisition of ECG signal is stopped, as indicated at step 708. The acquired image data is subsequently gated, retrospectively, into the M different cardiac phases, $P_m$ at step 710. For example, and referring again to FIG. 8, all of the image data acquired during a first target reconstruction window, $W_1$, is selected as corresponding to the first cardiac phase, $P_1$. For example, a target gating window of 167 milliseconds or less is employed, such that there is an effective increase in temporal resolution on the order of two or more. Alternatively, a narrow target reconstruction window, $W_1$, of 20 milliseconds or less can be employed, such that there is substantially only one view angle within the target reconstruction window. This retrospective gating produces a "cardiac phase image data set" for each of the M different desired cardiac phases. Therefore, each cardiac phase image data set includes a plurality of projection views acquired during the target reconstruction window, $W_m$, corresponding to a given cardiac phase, $P_m$. In the alternative, the original image data acquisition can be prospectively gated such that image data is only acquired at specific time points during the ECG signal. Following this data acquisition scheme, all of the image data acquired during a selected cardiac phase is similarly combined into a cardiac phase image data set.

Since each cardiac phase image data set is highly undersampled, an attempt to reconstruct images using standard image reconstruction algorithms, such as the well-known filtered backprojection ("FBP") method, will result in severe streaking artifacts. Therefore, and referring again to FIG. 7A, the method of the present invention proceeds by reconstructing a prior image, $I_P$, as indicated in step 712. The prior image, $I_P$, is reconstructed at step 712 using a conventional image reconstruction method, such as the FBP method. In particular, the prior image, $I_P$, is reconstructed from all of the image data acquired over the N view angles, $\theta_n$. Such a prior image will inherently lose the dynamic information associated with the beating heart, since the image data was acquired over a plurality of different cardiac phases; however, this dynamic information can be recovered when reconstructing the desired images of each cardiac phase. In the alternative, however, the prior image, $I_P$, can be reconstructed using other image reconstruction methods such as, for example, highly constrained backprojection ("HYPR"), which is described in co-pending U.S. patent application Ser. No. 11/482,372; HYPR local reconstruction ("HYPR-LR"), which is described in co-pending U.S. patent application Ser. No. 12/032,240; and iterative HYPR ("I-HYPR"), which is described in co-pending U.S. patent application Ser. No. 12/032,262. By employing the HYPR-LR method, for example, a further increase in the signal-to-noise ratio ("SNR") is possible in the desired image.

Proceeding with the image reconstruction method, an estimate of the desired image for a given cardiac phase, $P_m$, is subsequently produced at step 714. For example, this estimate can be an image reconstructed from the appropriate cardiac phase image data set using a FBP method. In the alternative, however, the prior image, $I_P$, can be employed. Next, an expanded image frame data set is formed for the given cardiac phase, as indicated at step 716. The expanded image frame data set is formed using the method described above with reference to FIG. 5, where the current time frame data set, $Y_t$, is formed from the image data included in the target reconstruction window, $W_m$. A desired image, I, of the selected cardiac phase, $P_m$, is subsequently reconstructed in accordance with one of the image reconstruction methods described above with reference to FIGS. 1, 2, and 3, while enforcing the appropriate data consistency condition, as indicated in step 718. For example, when employing the image reconstruction method described above with reference to FIG. 1, the modified data consistency condition of Eqn. (18) is employed along with the objective function of FIG. (2). On the other hand, when employing the image reconstruction method described above with reference to FIG. 2, the modified difference matrix of Eqn. (19) is employed along with the objective function of FIG. (20), and when employing the image reconstruction method described above with reference to FIG. 3, the modified difference matrix of Eqn. (19) is employed along with the objective function of FIG. (21).

Since the prior image, $I_P$, is not a high quality image, the regularization parameter, $\alpha$, is selected to mitigate the effects of the poor quality of the prior image, $I_P$. For example, a value of $\alpha \approx 0.3$-$0.7$ is employed. A desired image, I, is reconstructed for each cardiac phase, $P_m$, in this manner until an image for all of the desired cardiac phases has been reconstructed, as decided at process block 702. If all of the desired images have not been reconstructed, the method selects the next cardiac phase, $P_m$, at step 722 and proceeds with the image reconstruction method.

As an example of the above described data acquisition scheme, x-ray CT image data is acquired within a single gantry rotation and a breath-hold of around 12 seconds. For a patient having an average heart rate of 75 beats per minute ("bpm"), such image data is acquired over 15 heart beats. Therefore, the acquired image data is spread over these 15 heart beats, and over a single gantry rotation. This acquired image data is then retrospectively gated into different cardiac phases. For example, a target reconstruction window of 167 milliseconds or less is employed. In the alternative, a narrow target reconstruction window of 20 milliseconds or less can be employed, such that there is substantially only one view angle within the target reconstruction window. Thus, after gating, each cardiac phase includes only about 15 view angles. It is noted that instead of a fast gantry rotation speed, the present invention provides a method for reconstructing quality images from data acquired with a substantially reduced gantry rotation speed. When practicing the present invention in the above described manner, the temporal resolution is not determined by the gantry rotation speed. Instead, temporal resolution is determined by the temporal window for the acquisition of one cone-beam projection, which is determined by the detector readout speed for each cone-beam projection.

It should be appreciated by those skilled in the art that for the above described x-ray computed tomography image reconstruction method, many equivalents, alternatives, variations, and modifications, aside from those expressly stated, are possible and within the scope of the invention. For example, the subject's respiration can be monitored with a respiration monitoring device, such as a respiratory belt, and image data retrospectively gated based on the measured respiratory information. In this manner, motion, such as internal organ motion, can be compensated for when reconstructing images. Therefore, in general, the method of the present invention can utilize any signal indicative of subject motion to gate, or divide, acquired image data into a plurality of "motion phase image data sets."

X-Ray Multi-Detector Computed Tomography Image Reconstruction

Figure 7B:
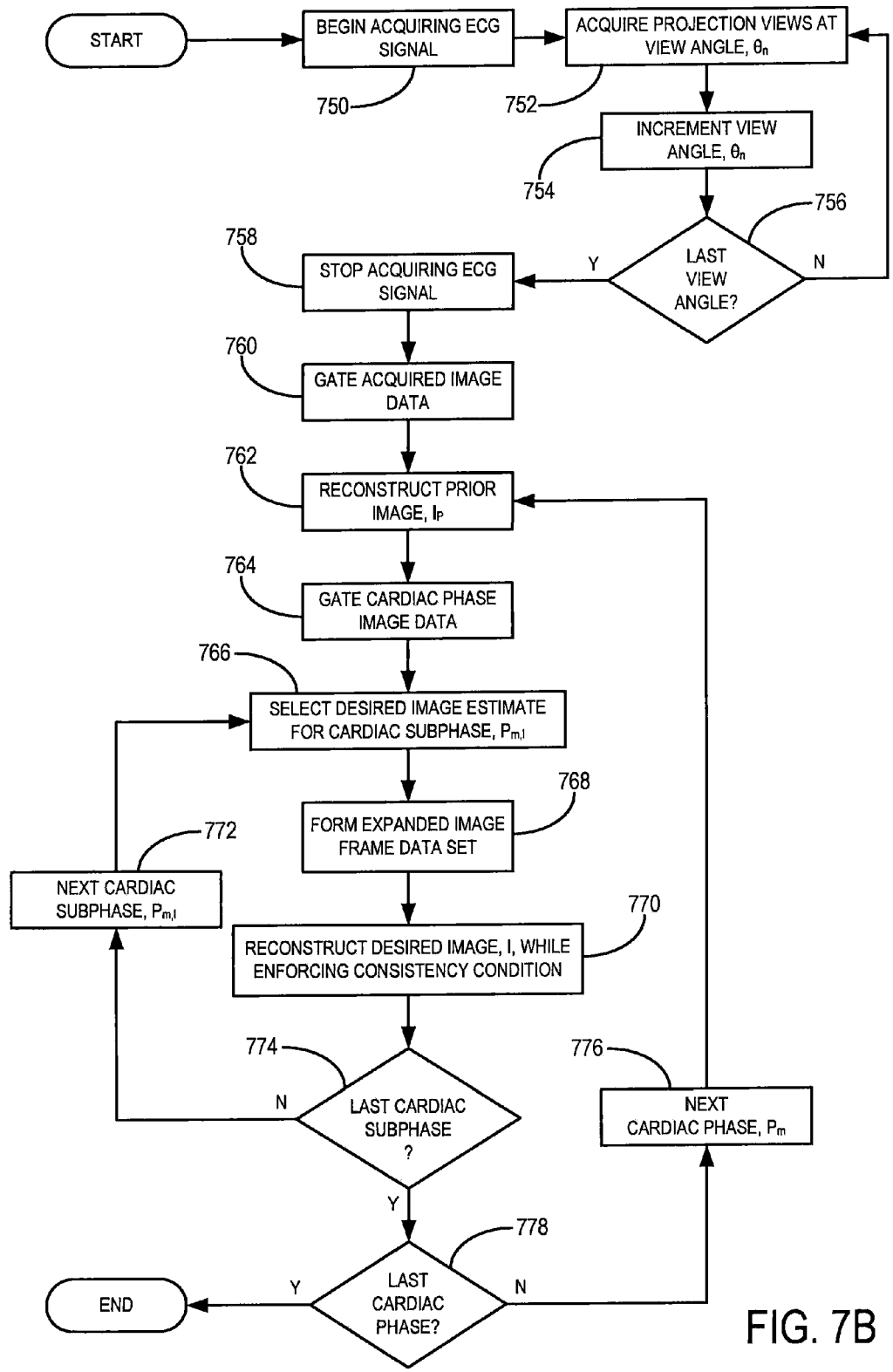
FIG. 7B is a flowchart setting forth the steps of an image reconstruction method that employs the present invention used in the CT system of FIG. 6A.

The method of the present invention is applicable not only to situations where images having high temporal resolution are reconstructed from image data acquired with a slow gantry rotation speed, but also to situations where a fast gantry rotation speed is employed. In this manner, the present invention can augment the temporal resolution of the state-of-the-art x-ray multi-detector computed tomography ("MDCT") imaging systems. Referring now to FIG. 7B, when practiced in an x-ray MDCT imaging system, the method of the present invention starts by acquiring an electrocardiogram ("ECG") signal from the subject, as indicated at step 750. This ECG signal is used to retrospectively gate the acquired image data into M different cardiac phases, $P_M$.

Data acquisition subsequently begins by acquiring image data in the form of a set of projection views at a first view angle, $\theta_n$, as indicated at step 752. The gantry is subsequently rotated to a new view angle at step 754. More image data is acquired at the new view angle, $\theta_{n+1}$, and this process is repeated until the gantry has been rotated to a last view angle, $\theta_N$, as determined at decision block 756. After all of the desired image data has been acquired, the acquisition of the ECG signal is stopped, as indicated at step 758. The acquired image data is subsequently gated, retrospectively, into the M different cardiac phases, $P_m$ in step 760. For example, and referring again to FIG. 8, all of the image data acquired during a first target reconstruction window, $W_1$, is selected as corresponding to the first cardiac phase, $P_1$. For example, in the state-of-the-art MDCT imaging systems, a target reconstruction window, $W_1$, of 150 milliseconds or less is employed. Such a target reconstruction window results corresponds, for example, to a duration of time during which the x-ray tube travels through an angular range of about 240 degrees (180 degrees plus the fan angle), which is the so-called short scan angular range. Thus, there are N≈640 view angles within the target reconstruction window. This retrospective gating produces a "cardiac phase image data set" for each of the M different desired cardiac phases. Therefore, each cardiac phase image data set includes a plurality of projection views acquired during the target reconstruction window, $W_m$, corresponding to a given cardiac phase, $P_m$. In the alternative, the original image data acquisition can be prospectively gated such that image data is only acquired at specific time points during the ECG signal. Following this data acquisition scheme, all of the image data acquired during a selected cardiac phase is similarly combined into a cardiac phase image data set.

Since each cardiac phase image data set (240 degree angular range and 640 projection view angles) is sufficiently sampled for accurate image reconstruction, standard image reconstruction methods, such as the well-known filtered backprojection ("FBP") method can employed to reconstruct images. However, due to the limited target reconstruction window width, $W_1$, the temporal resolution of the reconstructed images is limited to about half of the gantry rotation time. This fact is the underlying reason for the temporal resolution values presented above in Table 1. Therefore, the present invention proceeds to increase temporal resolution several fold without changing of gantry rotation speed. Specifically, and referring again to FIG. 7B, the method of the present invention proceeds by reconstructing a prior image, $I_P$, as indicated in step 762. The prior image, $I_P$, is reconstructed at step 762 using a conventional image reconstruction method, such as the FBP method. In particular, the prior image, $I_P$, is reconstructed from all of the image data acquired over the N view angles, $\theta_n$, within the target reconstruction window $W_1$.

The regular target reconstruction window with width $W_1$ is then divided into a total of L narrower subwindows, or "time windows," each with a width $W_1/L$, and the cardiac phase image data sets are further gated with these subwindows, as indicated at step 764. For example, the value of L can be selected to be 2, 3, or 4 such that the target reconstruction window, $W_1$, is divided into 2, 3, or 4 equal sections, respectively. Moreover, these values correspond to an increase in temporal resolution by a factor of 2, 3, or 4. For each subwindow, the projection view angle range is reduced by a factor of L. For example, the typical angular range corresponding to the regular target reconstruction window width is around 240 degree. After dividing the target reconstruction window into two subwindows, however, the angular range is 120 degrees for each subdivided cardiac phase image data set, or "cardiac subphase" image data set. Thus, the conventional image reconstruction methods, such as FBP method, cannot be employed to accurately reconstruct cardiac images from the cardiac subphase image data sets. The present invention is therefore applied to accurately reconstruct cardiac images for the L cardiac subwindows.

Proceeding with the image reconstruction method, an estimate of the desired image for a given cardiac subphase, $P_{m,l}$, (l=1,2, . . . L), is subsequently selected at step 766. For example, this estimate can be an image reconstructed from the appropriate cardiac phase image data set using a FBP method. In the alternative, however, the prior image, $I_P$, can be employed. Next, an expanded image frame data set is formed for the given cardiac phase, as indicated at step 768. The expanded image frame data set is formed using the method described above with reference to FIG. 5, where the current time frame data set, $Y_t$, is formed from the image data included in the cardiac gating subwindow, $W_m/L$. A desired image, I, of the selected cardiac subphase, $P_{m,l}$, is subsequently reconstructed in accordance with one of the image reconstruction methods described above with reference to FIGS. 1, 2, and 3, while enforcing the corresponding consistency condition in accordance with the method described above with reference to FIG. 5, as indicated in step 770. For example, when employing the image reconstruction method described above with reference to FIG. 1, the modified data consistency condition of Eqn. (18) is employed along with the objective function of FIG. (2). On the other hand, when employing the image reconstruction method described above with reference to FIG. 2, the modified difference matrix of Eqn. (19) is employed along with the objective function of FIG. (20), and when employing the image reconstruction method described above with reference to FIG. 3, the modified difference matrix of Eqn. (19) is employed along with the objective function of FIG. (21).

Since the prior image, $I_P$, is not a high temporal resolution image, some motion blurring and motion streaks appear in the prior image, $I_P$. Thus, the regularization parameter, $\alpha$, is appropriately selected to mitigate the effects of the poor temporal resolution of the prior image, $I_P$. For example, a value of $\alpha \approx 0.5$-$0.8$ is employed. A desired image, I, is reconstructed for each cardiac subphase, $P_{m,l}$, in this manner until an image for all of the desired cardiac subphases has been reconstructed, as determined at decision block 772. If all of the desired images have not been reconstructed, the method selects the next sub-cardiac phase, $P_{m,l}$, at step 774 and proceeds with the image reconstruction method. After all of the cardiac subphase images have been reconstructed for a given cardiac phase, $P_m$, a new cardiac phase is selected at step 776 and the above process repeated until all of the regular cardiac phases, $P_m$, have been utilized, as determined at decision block 778.

It should be appreciated by those skilled in the art that for the above described x-ray multi-detector computed tomography image reconstruction method, many equivalents, alternatives, variations, and modifications, aside from those expressly stated, are possible and within the scope of the invention. For example, the above described method for reconstructing higher temporal resolution images using a lower temporal resolution prior image can be iteratively implemented to generate higher and higher temporal resolution images. Also for example, the subject's respiration can be monitored with a respiration monitoring device, such as a respiratory belt, and image data retrospectively gated based on the measured respiratory information. In this manner, motion, such as internal organ motion, can be compensated for when reconstructing images. Therefore, in general, the method of the present invention can utilize any signal indicative of subject motion to gate, or divide, acquired image data into a plurality of "motion phase image data sets." Moreover, each target reconstruction window can be divided into a plurality of "time windows" such that a "motion subphase image data set" can be produced by dividing the motion phase image data set based on the time windows.

C-Arm X-Ray Imaging

Angiography C-arm systems have been modified by several vendors to enable cone-beam CT data acquisitions that provide soft tissue contrast for improved image guidance directly in an interventional suite. This represents a major advancement over the conventional rotational angiography data acquisition where only high contrast iodine filled vessels are reconstructed. Due to the slow gantry rotation speed, C-arm cone-beam CT is primarily applied in neuro-interventional procedures.

High quality non-invasive cardiac imaging is vitally important for safe and effective catheter-based interventions, specifically for pre-procedural planning, intra-procedural guidance, and post-procedural follow-up. The majority of catheter-based procedures are performed with x-ray fluoroscopic ("XRF") guidance, which offers reduced information due to the limited 2D projection imaging. A further, and major, limitation when using standard XRF is poor depiction of complex 3D anatomic structures, such as, for example, blood vessels and cardiac chambers. In response to this limitation, 3D modalities such as MRI, CT, 3D ultrasound, and electromagnetic navigation systems merged with XRF are currently under investigation. Despite this fact, accurate 3D-to-2D image registration remains a major challenge. Two major interventional applications deserve emphasis for they require superior image guidance. First, percutaneous coronary artery intervention ("PCI") for obstructive atherosclerosis, and second, pulmonary vein isolation ("PVI") for paroxysmal atrial fibrillation. Under these conditions, the same imaging system that acquires high quality 3D tomographic images could default to real-time fluoroscopy mode to enable immediate catheter based interventions. Immediately acquired and automatically registered time-resolved 3D tomographic images could facilitate improved procedural guidance, and may ultimately reduce ionizing radiation dose, and nephrotoxic contrast dose for certain interventions. Additionally, pre-procedural, intra-procedural, and post-procedural 3D cardiac cone-beam CT evaluation could be easily performed. The gantry rotation period in a typical interventional suite is slow (5-10 seconds), and therefore, it prevents one from obtaining high temporal resolution using the conventional cardiac CT imaging paradigm.

C-Arm X-Ray Imaging System

Figure 9A:
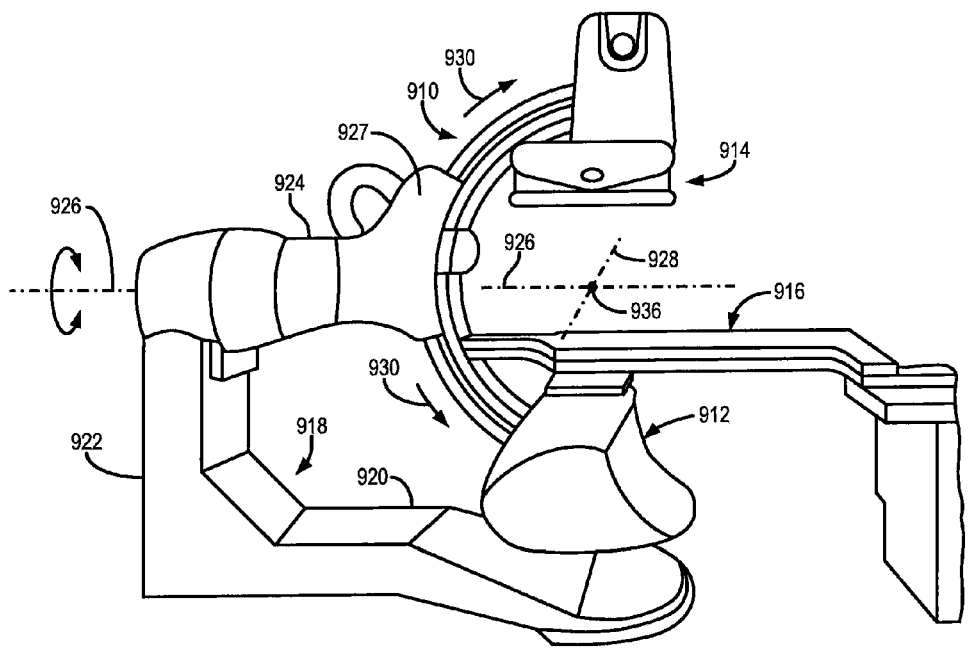
FIG. 9A is a pictorial view of a C-arm x-ray system which employs the present invention.
Figure 9B:
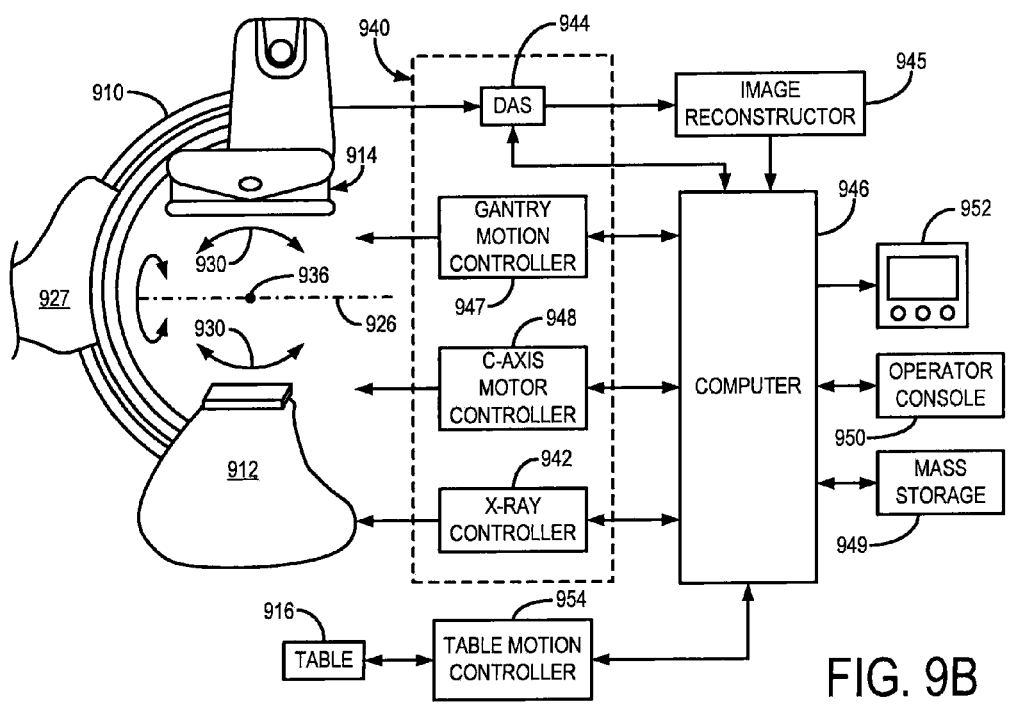
FIG. 9B is a block diagram of the C-arm x-ray system of FIG. 9A.

Referring particularly to FIGS. 9A and 9B, an embodiment of the invention employed to reconstruct images employs an x-ray system that is designed for use in connection with interventional procedures. It is characterized by a gantry having a C-arm 910 which carries an x-ray source assembly 912 on one of its ends and an x-ray detector array assembly 914 at its other end. The gantry enables the x-ray source 912 and detector 914 to be oriented in different positions and angles around a patient disposed on a table 916, while enabling a physician access to the patient.

The gantry includes an L-shaped pedestal 918 which has a horizontal leg 920 that extends beneath the table 916 and a vertical leg 922 that extends upward at the end of the horizontal leg 920 that is spaced from of the table 916. A support arm 924 is rotatably fastened to the upper end of vertical leg 922 for rotation about a horizontal pivot axis 926. The pivot axis 926 is aligned with the centerline of the table 916 and the arm 924 extends radially outward from the pivot axis 926 to support a C-arm drive assembly 927 on its outer end. The C-arm 910 is slidably fastened to the drive assembly 927 and is coupled to a drive motor (not shown) which slides the C-arm 910 to revolve it about a C-axis 928 as indicated by arrows 930. The pivot axis 926 and C-axis 928 intersect each other at an isocenter 936 located above the table 916 and they are perpendicular to each other.

The x-ray source assembly 912 is mounted to one end of the C-arm 910 and the detector array assembly 914 is mounted to its other end. As will be discussed in more detail below, the x-ray source 912 emits a cone beam of x-rays which are directed at the detector array 914. Both assemblies 912 and 914 extend radially inward to the pivot axis 926 such that the center ray of this cone beam passes through the system isocenter 936. The center ray of the cone beam can thus be rotated about the system isocenter around either the pivot axis 926 or the C-axis 928, or both during the acquisition of x-ray attenuation data from a subject placed on the table 916.

As shown in FIG. 1A, the x-ray source assembly 912 contains an x-ray source 932 which emits a cone beam 933 of x-rays when energized. The center ray 934 passes through the system isocenter 936 and impinges on a two-dimensional flat panel digital detector 938 housed in the detector assembly 914. The detector 938 is a 2048 by 2048 element two-dimensional array of detector elements having a size of 41 cm by 41 cm. Each element produces an electrical signal that represents the intensity of an impinging x-ray and hence the attenuation of the x-ray as it passes through the patient. During a scan the x-ray source 932 and detector array 938 are rotated about the system isocenter 936 to acquire x-ray attenuation projection data from different angles. The detector array is able to acquire 30 projections, or views, per second and this is the limiting factor that determines how many views can be acquired for a prescribed scan path and speed.

Referring particularly to FIG. 9B, the rotation of the assemblies 912 and 914 and the operation of the x-ray source 932 are governed by a control mechanism 940 of the CT system. The control mechanism 940 includes an x-ray controller 942 that provides power and timing signals to the x-ray source 932. A data acquisition system ("DAS") 944 in the control mechanism 940 samples data from detector elements 938 and passes the data to an image reconstructor 945. The image reconstructor 945, receives digitized x-ray data from the DAS 944 and performs high speed image reconstruction according to the methods of the present invention. The reconstructed image is applied as an input to a computer 946 which stores the image in a mass storage device 949 or processes the image further.

The control mechanism 940 also includes pivot motor controller 947 and a C-axis motor controller 948. In response to motion commands from the computer 946 the motor controllers 947 and 948 provide power to motors in the x-ray system that produce the rotations about respective pivot axis 926 and C-axis 928. A program executed by the computer 946 generates motion commands to the motor drives 947 and 948 to move the assemblies 912 and 914 in a prescribed scan path.

The computer 946 also receives commands and scanning parameters from an operator via console 950 that has a keyboard and other manually operable controls. An associated cathode ray tube display 952 allows the operator to observe the reconstructed image and other data from the computer 946. The operator supplied commands are used by the computer 946 under the direction of stored programs to provide control signals and information to the DAS 944, the x-ray controller 942 and the motor controllers 947 and 948. In addition, computer 946 operates a table motor controller 954 which controls the motorized table 916 to position the patient with respect to the system isocenter 936.

Figure 10A:
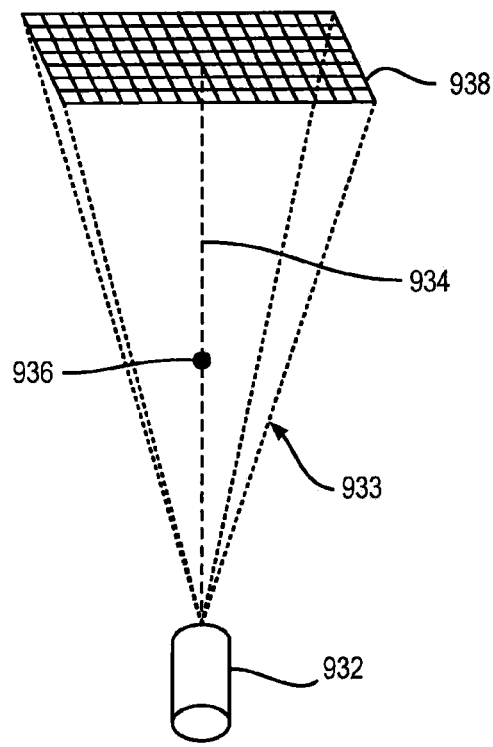
FIG. 10A is a pictorial view of the x-ray source and detector in the C-arm x-ray system of FIG. 9A.
Figure 10B:
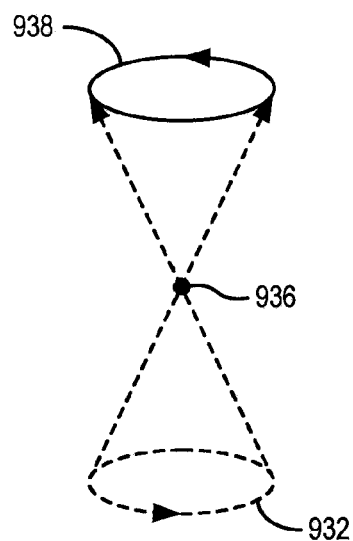
FIG. 10B is a pictorial view of the C-arm scan path employed by the C-arm x-ray system of FIG. 9A.

As shown in FIG. 10D, this scan path is performed by simultaneously operating the pivot axis motor controller 847 and C-axis motor controller 849 to move the x-ray source 832 in a circular or elliptical orbit below the isocenter 936 and the detector 938 in a corresponding circular orbit above the isocenter 936. The size of the circular orbit is determined by a number of factors, but the objective is to make the enclosed area of the path as large as possible. The constraining factor is that the gantry should move through the entire circular path to acquire a single tomosynthesis data set at the frame rate needed to capture the dynamic changes that occur during the inflow of contrast agent. In this embodiment of the invention up to 10 image data sets are acquired in this manner.

C-Arm X-Ray Image Reconstruction

As described above, the same x-ray C-arm imaging system can be employed to acquire high quality 3D tomographic images and real-time fluoroscopy images to enable immediate catheter based interventions, as further described, for example, in U.S. Pat. No. 7,218,702. In this manner, time-resolved 3D tomographic images are immediately acquired and automatically registered to facilitate improved procedural guidance. This not only reduces ionizing radiation dose, but also nephrotoxic contrast dose for certain interventions. Moreover, this capability allows for pre-procedural, intra-procedural, and post-procedural 3D cardiac cone-beam CT evaluation performed as described.

Figure 11:
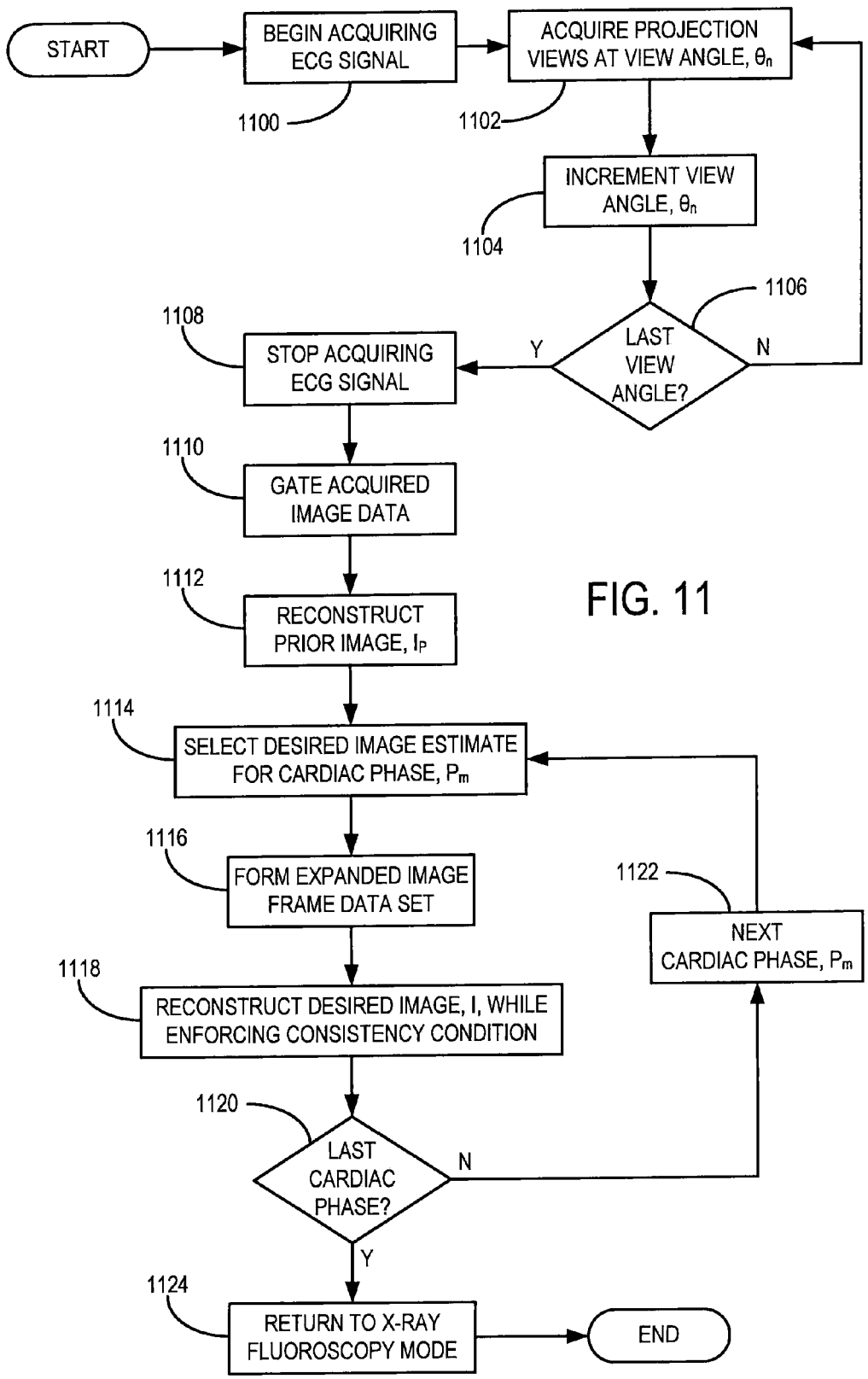
FIG. 11 is a flowchart setting forth the steps of an image reconstruction method that employs the present invention in a scan performed by the C-arm x-ray imaging system of FIG. 9A.

Accordingly, when practiced in an x-ray C-arm imaging system, the method of the present invention proceeds similar to the manner as described above with reference to FIG. 7A. Referring particularly to FIG. 11, when operating in a 3D computed tomography mode, the method starts by acquiring an electrocardiogram ("ECG") signal from the subject, as indicated at step 1100. This ECG signal is used to retrospectively gate the acquired image data into M different cardiac phases, $P_M$. Data acquisition subsequently begins by acquiring image data in the form of a set of projection views at a first view angle, $\theta_n$, as indicated at step 1102. The gantry is subsequently rotated to a new view angle at step 1104, where image data is then acquired. This process is repeated until the gantry has been rotated to a last view angle, $\theta_N$, as indicated by decision block 1106. After all of the desired image data has been acquired, the acquisition of the ECG signal is stopped, as indicated at step 1110. The acquired image data is subsequently gated, retrospectively, into the M different cardiac phases, $P_m$, as described above in detail. This retrospective gating produces a "cardiac phase image data set" for each of the M different desired cardiac phases. Therefore, each cardiac phase image data set includes a plurality of projection views acquired during the target reconstruction window, $W_m$, corresponding to a given cardiac phase, $P_m$. In the alternative, the original image data acquisition can be prospectively gated such that image data is only acquired at specific time points during the ECG signal. Following this data acquisition scheme, all of the image data acquired during a selected cardiac phase is similarly combined into a cardiac phase image data set.

Since each cardiac phase image data set is highly undersampled, an attempt to reconstruct images using standard image reconstruction algorithms, such as the well-known filtered backprojection ("FBP") method, will result in severe streaking artifacts. Therefore, the method of the present invention proceeds by reconstructing a prior image, $I_P$, as indicated in step 1110. The prior image, $I_P$, is reconstructed at step 1112 using a conventional image reconstruction method, such as the FBP method. In particular, the prior image, $I_P$, is reconstructed from all of the image data acquired over the N view angles, $\theta_n$. Such a prior image will inherently lose the dynamic information associated with the beating heart, since the image data was acquired over a plurality of different cardiac phases; however, this dynamic information is recovered when reconstructing the desired images of each cardiac phase. In the alternative, however, the prior image, $I_P$, can be reconstructed using other image reconstruction methods such as, for example, HYPR, HYPR-LR, and I-HYPR. By employing the HYPR-LR method, for example, a further increase in the signal-to-noise ratio ("SNR") is possible in the desired image.

Proceeding with the image reconstruction method, an estimate of the desired image for a given cardiac phase, $P_m$, is subsequently produced at step 1114. For example, this estimate can be an image reconstructed from the appropriate cardiac phase image data set using a FBP method. In the alternative, however, the prior image, $I_P$, can be employed. Next, an expanded image frame data set is formed for the given cardiac phase, as indicated at step 1116. The expanded image frame data set is formed using the method described above with reference to FIG. 5, where the current time frame data set, $Y_t$, is formed from the image data included in the target reconstruction window, $W_m$. A desired image, I, of the selected cardiac phase, $P_m$, is subsequently reconstructed in accordance with one of the image reconstruction methods described above with reference to FIGS. 1, 2, and 3, while enforcing the appropriate data consistency condition, as indicated in step 1118. For example, when employing the image reconstruction method described above with reference to FIG. 1, the modified data consistency condition of Eqn. (18) is employed along with the objective function of FIG. (2). On the other hand, when employing the image reconstruction method described above with reference to FIG. 2, the modified difference matrix of Eqn. (19) is employed along with the objective function of FIG. (20), and when employing the image reconstruction method described above with reference to FIG. 3, the modified difference matrix of Eqn. (19) is employed along with the objective function of FIG. (21).

Since the prior image, $I_P$, is not a high quality image, the regularization parameter, $\alpha$, is selected to mitigate the effects of the poor quality of the prior image, $I_P$. For example, a value of $\alpha \approx 0.3\text{-}0.7$ is employed. A desired image, I, is reconstructed for each cardiac phase, $P_m$, in this manner until an image for all of the desired cardiac phases has been reconstructed, as decided at process block 1120. If all of the desired images have not been reconstructed, the method selects the next cardiac phase, $P_m$, at step 1122 and proceeds with the image reconstruction method.

When the 3D tomographic imaging is completed, the x-ray C-arm imaging system is returned to an x-ray fluoroscopic imaging mode, as indicated at step 1124. An interventional procedure, such as a cardiac catheterization procedure, can subsequently be performed with increased image guidance from the high quality 3D tomographic images reconstructed using the method of the present invention. Since the subject is not physically moved from one imaging system to the next, the imaging volumes of the 3D tomographic images and the subsequently acquired 2D x-ray fluoroscopic images are automatically registered. This provides an increase in reliability of CT image guided interventional procedures.

It should be appreciated by those skilled in the art that for the above described x-ray C-arm image reconstruction method, many equivalents, alternatives, variations, and modifications, aside from those expressly stated, are possible and within the scope of the invention. For example, the subject's respiration can be monitored with a respiration monitoring device, such as a respiratory belt, and image data retrospectively gated based on the measured respiratory information. In this manner, motion, such as internal organ motion, can be compensated for when reconstructing images. Therefore, in general, the method of the present invention can utilize any signal indicative of subject motion to gate, or divide, acquired image data into a plurality of "motion phase image data sets."

The present invention has been described in terms of one or more preferred embodiments, and it should be appreciated that many equivalents, alternatives, variations, and modifications, aside from those expressly stated, are possible and within the scope of the invention. For example, the method of the present invention can be practiced in any imaging system in order to enhance the temporal resolution of image data acquired therewith. Exemplary alternate imaging systems that can be employed when practicing the present invention include magnetic resonance imaging ("MRI") systems, positron emission tomography ("PET") systems, and single photon emission computed tomography ("SPECT") systems. It will be appreciated by those skilled in the art that by acquiring image data with such systems in a manner similar to those acquisition schemes described herein that the present invention is readily adaptable to these alternate imaging systems. However, it should also be appreciated by those skilled in the art that data acquisition schemes other that those expressly stated herein can be employed.

The invention claimed is:

1. A method for reconstructing an image of a subject with an x-ray imaging system, the steps comprising:
   a) acquiring, with the x-ray imaging system, a time series of image data of the subject;
   b) forming an expanded image frame data set by combining image data associated with a current time frame with image data not associated with the current image frame;
   c) selecting an estimate image of the subject;
   d) reconstructing a prior image of the subject from the time series of image data acquired in step a);
   e) producing a sparsified image of the subject using the prior image and the estimate image; and f) reconstructing an image of the subject corresponding to the current time frame using the sparsified image, the estimate image, and the acquired time series of image data, wherein the image is reconstructed while enforcing consistency between the expanded data set and a forward projection of the image of the subject.

2. The method as recited in claim 1 in which the image data not associated with the current time frame in step b) is between 5 and 15 percent of the image data not included in the image data associated with the current image frame.

3. The method as recited in claim 2 in which the image data not associated with the current time frame is distributed substantially evenly in projection space.

4. The method as recited in claim 1 in which steps b)-f) are repeated to produce a time series of images of the subject.

5. The method as recited in claim 4 in which the time series of image data is acquired with a first temporal resolution and the time series of images is indicative of a second temporal resolution that is higher than the first temporal resolution.

6. The method as recited in claim 1 further comprising:
g) acquiring a signal indicative of subject motion; and
h) producing a motion phase image data set from the acquired time series of image data.

7. The method as recited in claim 6 in which the image data associated with the current time frame in step b) is selected as the motion phase image data set produced in step h).

8. The method as recited in claim 6 in which step h) includes:
selecting a target reconstruction window indicative of a time period in the acquired signal indicative of subject motion; and
selecting, from the acquired time series of image data, image data acquired during the target reconstruction window.

9. The method as recited in claim 6 in which the image data associated with the current time frame in step b) is selected as the motion phase image data set produced in step h) and the image data not associated with the current time frame is selected from portions of the time series of image data not acquired during the target reconstruction window.

10. The method as recited in claim 8 in which step h) further includes:
dividing the selected target reconstruction window into a plurality of time windows; and
dividing the motion phase image data set into a corresponding plurality of motion subphase image data sets using the plurality of time windows.

11. The method as recited in claim 10 in which the image data associated with the current time frame in step b) is selected as one of the plurality of motion subphase image data sets.

12. The method as recited in claim 6 in which step b) includes reconstructing the estimate image from the motion phase image data set.

13. The method as recited in claim 6 in which the subject motion is physiological motion of the heart, the signal indicative of the subject motion is an electrocardiogram (ECG) signal, and the motion phase image data set is a cardiac phase image data set.

14. The method as recited in claim 1 in which step e) includes subtracting the prior image from the estimate image.

15. The method as recited in claim 1 in which step f) includes:
f)i) producing an objective function using the sparsified image, the estimate image, and the acquired time series of image data;
f)ii) reconstructing the image by iteratively minimizing the objective function; and
f)iii) enforcing a consistency condition between the expanded image frame data set and a forward projection of the image during each iteration in step f)ii).

16. The method as recited in claim 15 in which step f)i) includes:
producing at least a first and second objective function term, wherein the at least first objective function term is produced by applying a sparsifying transform to the sparsified image and the at least second objective function term is produced by applying a sparsifying transform to the estimate image; and
adding the at least first and second objective function terms.

17. The method as recited in claim 16 in which step f)i) further includes calculating a norm of the at least first and second objective function terms and weighting the calculated norms using a regularization parameter.

18. The method as recited in claim 1 in which the x-ray imaging system is at least one of an x-ray computed tomography (CT) imaging system and a C-arm x-ray imaging system.

19. The method as recited in claim 1 in which step b) includes combining the image data associated with a current time frame with the image data not associated with the current image frame using a union operation.

20. A method for reconstructing an image of a subject with an imaging system, the steps comprising:
a) acquiring, with the imaging system at a first temporal resolution, a time series of image data of the subject;
b) forming an expanded image frame data set by combining image data associated with a current time frame with image data associated with a different time frame;
c) selecting an estimate image of the subject;
d) reconstructing a prior image of the subject from the time series of image data acquired in step a);
e) producing a sparsified image of the subject using the prior image and the estimate image; and
f) reconstructing an image of the subject corresponding to each of the different current time frames using the sparsified image, the estimate image of each current time frame, and the acquired time series of image data, wherein the image of the subject is indicative of a second temporal resolution that is higher than the first temporal resolution and the image is reconstructed while enforcing consistency between the expanded data set and a forward projection of the image of the subject.

* * * * *